US006545768B1

(12) United States Patent
Matsubara et al.

(10) Patent No.: US 6,545,768 B1
(45) Date of Patent: Apr. 8, 2003

(54) METHOD AND APPARATUS FOR TRANSMITTING IMAGE TO EXTERNAL DEVICE

(75) Inventors: Masatomo Matsubara, Toyohashi (JP); Koichi Nagata, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/082,222

(22) Filed: May 20, 1998

(30) Foreign Application Priority Data

May 23, 1997 (JP) .............................. 9-133969
Jul. 8, 1997 (JP) .............................. 9-182286
Jul. 8, 1997 (JP) .............................. 9-182287
Jul. 8, 1997 (JP) .............................. 9-182288

(51) Int. Cl.$^7$ ........................ G06F 15/00; H04N 1/00; H04N 1/32
(52) U.S. Cl. .................. 358/1.15; 358/402; 358/405; 358/442
(58) Field of Search .................. 358/400, 402, 358/405, 407, 442, 468, 1.15

(56) References Cited

U.S. PATENT DOCUMENTS 5,739,919 A * 4/1998 Lee et al. .................. 358/442
5,793,498 A * 8/1998 Scholl et al. ................ 358/434
5,805,298 A * 9/1998 Ho et al. ..................... 358/402
5,812,278 A * 9/1998 Toyoda et al. ............... 358/402
5,881,233 A * 3/1999 Toyoda et al. .......... 395/200.48

FOREIGN PATENT DOCUMENTS

JP 06-078120 3/1994

* cited by examiner

Primary Examiner—Kimberly A. Williams
(74) Attorney, Agent, or Firm—Sidley Austin Brown & Wood LLP

(57) ABSTRACT

An image transmitting apparatus for transmitting image data to an external image receiving apparatus through a network, includes: an image reading unit which reads an image of a document and generates image data of the document; a transmitting unit which is connectable with a first network and a second network to transmit the image data of the document to the external image receiving apparatus, the first network being different from the second network; and a controller which controls the transmitting unit such that the image data of the document is transmitted to the external image receiving apparatus through one of the first and second networks, and such that the image data of the document is retransmitted to the external image receiving apparatus through the remaining one of the first and second networks.

34 Claims, 22 Drawing Sheets

CONTENTS OF ONE-TOUCH
DIAL KEY REGISTRATION 01-1 : 03-3***-1234
  01-2 : 03-3***-1235
  01-3 : 03-3***-1236
  01-4 : *@b.co.jp 02-1 : 045-3-1234
  02-2 : 045-3**-1235
  02-3 : 045-3**-1236

CONTENTS OF ONE-TOUCH
DIAL KEY REGISTRATION 01-1 : 03-3***-1234
  01-2 : 03-3***-1235
  01-3 : 03-3***-1236
  01-4 : 03-3***1237
  01-5 : *@b.co.jp 02-1 : 045-3-1234
  02-2 : 045-3**-1235
  02-3 : 045-3**-1236

ME THOD AND APPARATUS FOR
TRANSMITTING IMAGE TO EXTERNAL
DEVICE

This application is based on application Nos. 9-133969, 9-182286, 9-182287, and 9-182288 filed in Japan, the contents of which are hereby incorporated by reference.

BACKGROUND OF THE INVENTION

1. Field of the Invention

The present invention relates to an apparatus and method for transmitting an image to a remote site. Also, the present invention relates to an apparatus and method for receiving an image transmitted from a remote site. Particularly, the present invention relates to a facsimile apparatus and a method of transmitting or receiving an image by a facsimile apparatus. More particularly, the present invention relates to a facsimile apparatus connected to the Internet to transmit/receive an image using the Internet and a telephone line, and a method of transmitting/receiving an image through the facsimile apparatus connected to the Internet.

2. Description of the Related Art

Facsimile apparatuses are well known and available for practical usage. A facsimile apparatus communicates with a remote facsimile apparatus through a communication line to transmit or receive an image (transmission and reception may be generically referred to as "communication" hereinafter). One type of such facsimile apparatuses is a facsimile apparatus connected to the Internet. In the communication of an image to an apparatus of another party through a telephone line, communication under a sequence similar to that of a normal facsimile apparatus is carried out. In the communication of an image via an Internet dedicated line, the apparatus converts the image data into text data to perform communication in the form of electronic mail. The apparatus provides image communication with a remote facsimile apparatus by selectively utilizing two types of communication lines, i.e. the telephone line and the Internet leased line.

The conventional facsimile apparatus connected to the Internet carries out the communication of an image by either the telephone line or the Internet leased line. When the telephone line of the recipient is busy in the event of trying to send an image through the telephone line thereto, the actual transmission of the image may be time consuming. In the case of image transmission to a remote recipient through a telephone line, the communication fee is expensive and the running cost is high. An image can be transmitted in the form of electronic mail using the Internet leased line. In this case, the transmission cost can be relatively lower than that through a telephone line even if the recipient is located far away. However, the actual delivery of the electronic mail to the recipient is indefinite. The user of the transmission side does not know when the recipient obtains the image.

The conventional Internet-connected facsimile apparatus that can perform image communication in the form of electronic mail using an Internet leased line supports only text data.

SUMMARY OF THE INVENTION

An object of the present invention is to provide an improved facsimile apparatus and facsimile communication method.

Another object of the present invention is to provide an improved Internet-connected facsimile apparatus and facsimile communication method.

According to an aspect of the present invention, an image transmitting apparatus for transmitting image data to an external image receiving apparatus through a network, includes: an image reading unit which reads an image of a document and generates image data of the document; a transmitting unit connectable with a first network and a second network to transmit the image data of the document to the external image receiving apparatus; and a controller which controls the transmitting unit such that the image data of the document is transmitted to the external image receiving apparatus through one of the first and second networks, and such that the image data of the document is retransmitted to the external image receiving apparatus through the remaining one of the first and second networks. The first network differs from the second network.

Since the controller transmits the image data of the document simultaneously through the first and second networks, the external image receiving apparatus can carry out a process according to the image data that is received ahead of the other to improve the speed of the process.

According to another aspect of the present invention, an image receiving apparatus for receiving data regarding a document from an external image transmitting apparatus through a network, includes: a receiving unit connectable with a first network and a second network to receive data regarding a document from the external image transmitting apparatus; an image forming unit for forming an image of the document on a recording sheet based on the received data; and a controller which controls the receiving unit and the image forming unit such that the image of the document based on the data transmitted through one of the first and second networks is formed and such that the image of the document based on the data retransmitted through the remaining one of the first and second networks is not formed. The first network differs from the second network.

Since the controller forms an image of the document according to the data transmitted through one of the first and second networks, a process according to the image data that is received ahead of the other from the external image transmitting apparatus can be carried out to improve the processing speed.

According to a further aspect of the present invention, an image transmitting apparatus for transmitting an image to an external image receiving apparatus through a network, includes: an image reading unit which reads an image of a document and generates image data of the document; a memory unit for storing data regarding a binary file; a transmitting unit connectable with a network to transmit electronic mail to the external image receiving apparatus; a converter which converts the image data read by said image reading unit into first text data and converts the data regarding the binary file into second text data; and a controller which controls the transmitting unit such that the electronic mail which contains the first text data and the second text data is transmitted.

Since the controller provides control of the transmitting unit so that the electronic mail including the first and second text data is transmitted, a binary file can be transmitted to the external image receiving apparatus.

According to still another aspect of the present invention, an image receiving apparatus for receiving an image from an external image transmitting apparatus through a network, includes: an image forming unit which forms an image of a document sent from the external image transmitting apparatus; a memory unit for storing data regarding a binary file; and a receiving unit connectable with a network to receive electronic mail from the external image transmitting apparatus. The electronic mail contains first text data and second text data. The first text data represents image data of a document, and the second text data represents data regarding a binary file. The image receiving apparatus of the present aspect further includes a converter which converts the first text data into the image data and the second text data into the data regarding the binary file; and a controller which controls the image forming unit such that an image based on the image data converted by the converter is formed and controls the memory unit such that the data regarding the binary file converted by the converter is stored.

Since the controller provides control of the memory unit such that the converted binary file is stored, the user can have the binary file received from the external image transmitting apparatus stored.

According to a still further aspect of the present invention, an image transmitting apparatus for transmitting an image to an external image receiving apparatus through a network, includes: a transmitting unit connectable with a telephone network and the Internet; a memory unit which stores a facsimile number and an electronic mail address of the external image receiving apparatus; a converter which converts image data into text data; and a controller which controls the transmitting unit such that the image data is transmitted to the external image receiving apparatus through the telephone network in accordance with the facsimile number stored in the memory unit, and such that electronic mail containing the text data converted by the converter is transmitted to the external image receiving apparatus through the Internet based on the electronic mail address stored in the memory unit in a case where the transmission of the image data through the telephone network cannot be established.

When the controller cannot transmit image data through the telephone line, electronic mail including the converted text data is transmitted through the Internet. Therefore, image data can be transmitted more efficiently.

According to yet a further aspect of the present invention, an image transmitting apparatus for transmitting an image to an external image receiving apparatus through a network, includes: an image reading unit which reads an image of a document and generates image data; a memory which stores a first identification code and a second identification code; a transmitting unit connectable with a network; and a mode selector which selectively sets one of a first transmitting mode and a second transmitting mode. The first and second identification codes serve to identify the external image receiving apparatus. The first identification code corresponds to the first transmitting mode, and the second identification code corresponds to the second transmitting mode. The image transmitting apparatus of the present aspect further includes a controller which controls the transmitting unit such that the image data generated by the image reading unit is transmitted to the external image receiving apparatus through the network under the selected transmitting mode in accordance with the respective identification code.

Since the controller sends image data to the external image receiving apparatus through the network at the selected transmission mode, the user can arbitrarily determine whether to give priority to communication cost reduction or communication time reduction.

According to yet another aspect of the present invention, a method for transmitting image data to an external image receiving apparatus through a network, includes the steps of: reading an image of a document and generating image data of the document; and transmitting the image data of the document to the external image receiving apparatus through one of a first network and a second network, and retransmitting the image data of the document to the external image receiving apparatus through the remaining one of the first and second networks.

Since image data of the document is transmitted simultaneously through the first and second networks, the external image receiving apparatus can carry out a process according to the image data that was received ahead of the other to improve the processing speed.

According to yet a still further aspect of the present invention, a method for receiving data regarding a document from an external image transmitting apparatus through a network, includes the steps of: receiving data regarding a document from the external image transmitting apparatus through one of a first network and a second network; forming an image of the document based on the data transmitted through one of the first and second networks, and not forming an image of the data based on the data retransmitted through the remaining one of the first and second networks.

Since an image of a document is formed according to the data transmitted through one of first and second networks, the external image transmitting apparatus can carry out a process according to the image data that is received ahead of the other to improve the processing speed.

According to an additional aspect of the present invention, a method for transmitting an image to an external image receiving apparatus through a network, includes the steps of: reading an image of a document and generating image data of the document; converting the generated image data into first text data and data regarding a binary file into second text data; and transmitting electronic mail which contains the first and second text data through a network.

Since electronic mail including first and second text data is transmitted through a network, a binary file can be transmitted to an external image receiving apparatus.

According to yet an additional aspect of the present invention, a method for receiving an image from an external image transmitting apparatus through a network, includes the steps of: receiving electronic mail from the external image transmitting apparatus. The electronic mail contains first text data and second text data. The first text data represents image data of a document, and the second text data represents data regarding a binary file. The method of the present aspect further includes the steps of converting the first text data into the image data and the second text data into the data regarding the binary file; and forming an image based on the converted image data and storing the converted data regarding the binary file.

Since the converted binary file is stored, the user can have the binary file received from the external image transmitting apparatus retained.

According to yet a still further aspect of the present invention, a method for transmitting an image to an external image receiving apparatus through a network includes the steps of: converting image data into text data; and transmitting the image data to the external image receiving apparatus through a telephone network in accordance with a facsimile number; and transmitting electronic mail containing the converted text data to the external image receiving apparatus through the Internet based on an electronic mail address in a case where the transmission of the image data through the telephone network cannot be established.

When image data cannot be transmitted through the telephone line, electronic mail including converted text data is transmitted through the Internet. Therefore, the user can transmit image data more efficiently.

According to a further aspect of the present invention, a method for transmitting an image to an external image receiving apparatus through a network includes the steps of: reading an image of a document and generating image data; selecting one of a first transmitting mode and a second transmitting mode; and transmitting the generated image data to the external image receiving apparatus through a network under the selected transmitting mode in accordance with the respective identification code. A first identification code corresponds to the first transmitting mode, and a second identification code corresponds to the second transmitting mode.

Since image data is transmitted to the external image receiving apparatus through a network under a selected transmission mode, the user can arbitrarily determine whether to give priority to reduction in the communication cost or in the communication time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
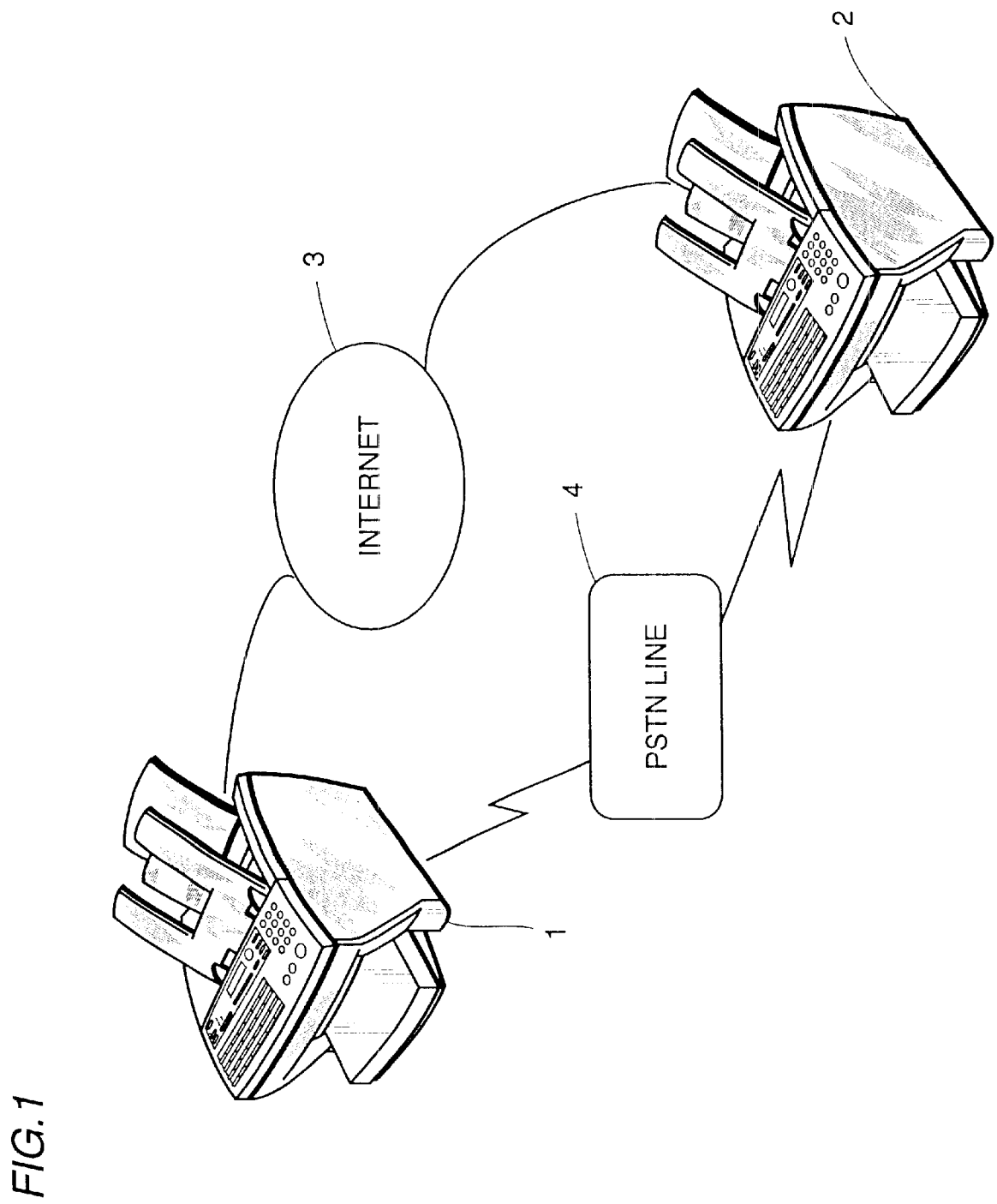
FIG. 1 is a diagram for describing connection of facsimile apparatuses according to a first embodiment of the present invention.

Referring to FIG. 1, a facsimile apparatus 1 and a facsimile apparatus 2 are connected by an Internet leased line 3 and a telephone line (PSTN line: Public Switched Telephone Network line) 4. The two facsimile apparatuses are identified by the electronic mail address on the Internet leased line 3 and by a facsimile number on telephone line 4. Image data can be transferred between facsimile apparatus 1 and facsimile apparatus 2 through Internet leased line 3 and telephone line 4.

The user sends image data from one to the other of facsimile apparatuses 1 and 2. In designating the transmission destination, the user enters the facsimile number and the electronic mail address of the recipient. The corresponding facsimile number and electronic address can be registered as one recipient by a one-touch dial or shortened dial to specify a desired recipient using the function of one-touch dialing or shortened dialing.

Figure 2:
FIG. 2 shows an appearance of a facsimile apparatus according to the first embodiment of the present invention.

FIG. 2 shows an appearance of facsimile apparatus 1 (also facsimile apparatus 2) of the first embodiment. Referring to FIG. 2, the facsimile number, the mail address of the recipient, the facsimile operation mode and the like are entered through an operation panel 11. The user depresses a predetermined key on operation panel 11, whereby the image of the document placed on a document feed tray 12 is optically read sequentially one by one. The photoelectric-converted image data is transmitted to the facsimile apparatus of the recipient. The document from which an image is read out is discharged onto a document discharge tray 13 one by one.

When image data is transmitted from another facsimile apparatus, a recording sheet is supplied from a recording sheet feed tray 14. An image is printed out on the recording sheet according to the received image data. The printed recording sheet is discharged onto a recording sheet discharge tray 15 one sheet at a time.

Figure 3:
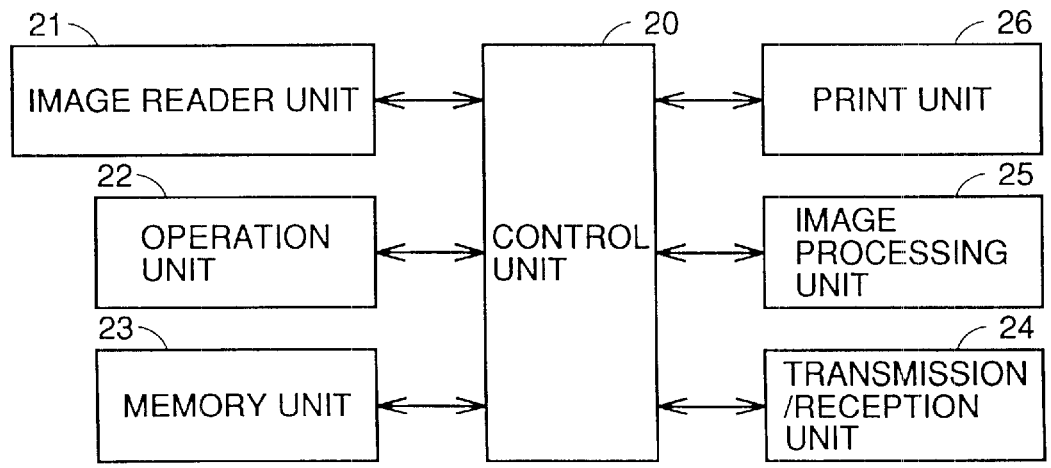
FIG. 3 is a diagram for describing the outline of the control of transmission and reception of the facsimile apparatus of the first embodiment.

Referring to FIG. 3, facsimile apparatus 1 has an image reader 21 for reading out an image to be transmitted, an operation unit 22 (including operation panel 11 of FIG. 2) for entering manipulation to carry out a predetermined operation associated with transmission and reception, a memory unit 23 for storing image data that is transmitted/received, as necessary, a transmitter/receiver unit 24 for transmitting/receiving image data, an image processing unit 25 for applying image processing on the image data, and a print unit 26 for printing out an image according to the image-processed image data, all connected to a control unit 20 that includes a CPU (Central Processing Unit), a ROM (Read Only Memory), and a RAM (Random Access Memory).

In transmitting an image of a document, the user sets the document on document feed tray 12 (refer to FIG. 2), and enters a predetermined operation through operation panel 11. Upon designating initiation of transmission of a document through operation panel 11, the image of the document is read out by image reader 21 to generate image data under control of control unit 20. The generated image data is temporarily stored in memory unit 23. The image data subjected to a process by image processing unit 25 is sent from transmitter/receiver unit 24 to the transmitter/receiver unit of facsimile apparatus 2 of the recipient.

The process carried out by image processing unit 25 includes the process of transmission utilizing a telephone line and the Internet. A process similar to that of a normal facsimile apparatus is carried out when transmission is effected through the telephone line. For example, the compression process of the image data is included. The process of converting image data into text data is included as the process when transmission is effected using the Internet. The image data converted into text data is transmitted as the body message of the electronic mail.

In an image receiving mode, image data is received from transmitter/receiver unit 24 under control of control unit 20. The received image data is temporarily stored in memory unit 23. The image data is subjected to a process by image processing unit 25. Image data is printed out by printer unit 26 according to the processed image data.

The process carried out by image processing unit 25 includes the process of reception using the telephone line and the Internet. A process similar to that of a normal facsimile apparatus is carried out when reception is effected through the telephone line. For example, an expansion process of the compressed image data is carried out. In a reception operation using the Internet, the process of converting the text data of the main body of the received electronic mail into image data is included.

Figure 4:
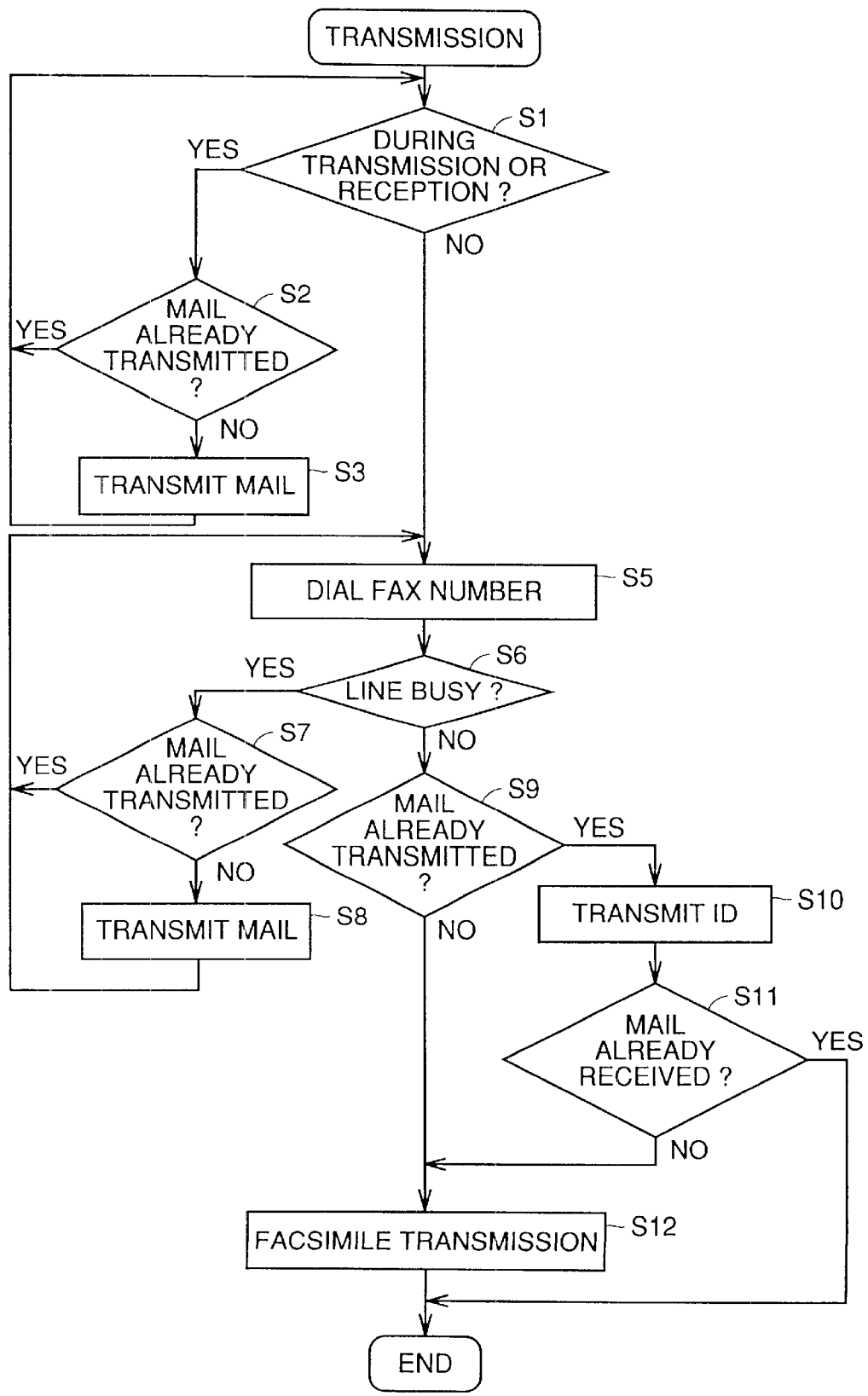
FIG. 4 is a flow chart showing the control procedure of the facsimile apparatus at the sender side according to the first embodiment.
Figure 5B:
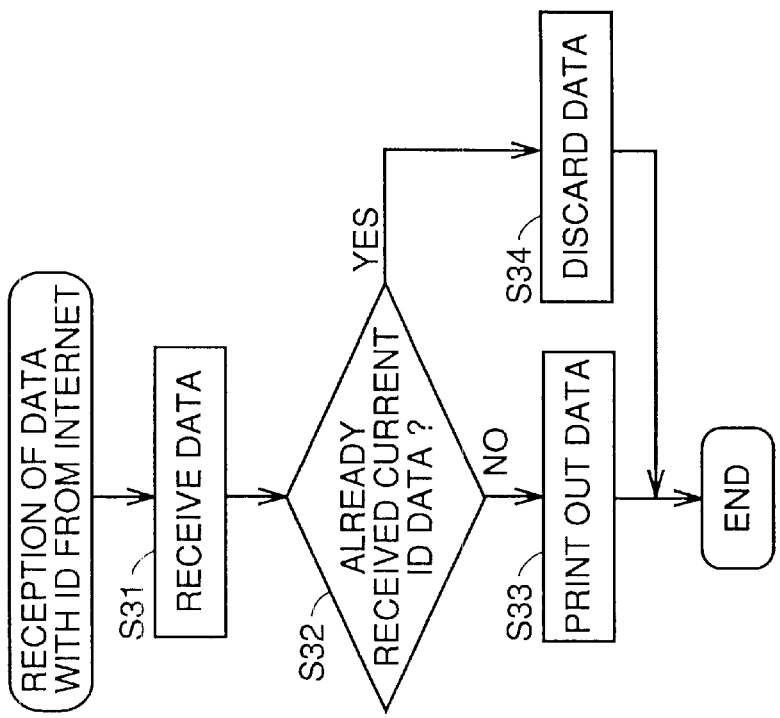
FIGS. 5A and 5B are flow charts showing the control procedure of the facsimile apparatus of the recipient side according to the first embodiment.
Figure 5A:
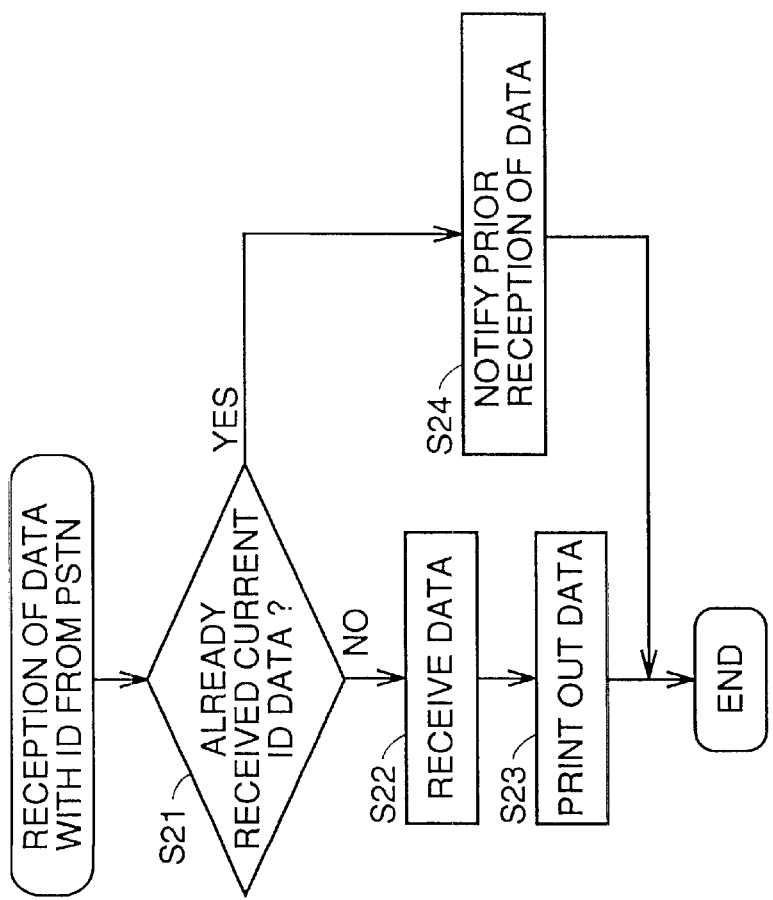

The control as shown in FIGS. 4, 5A and 5B corresponding to the transmitter side and the receiver side is provided by control unit 50 of facsimile apparatuses 1 and 2.

FIG. 4 is a flow chart for transmission.

When designation of transmission of image data of a facsimile document through the facsimile apparatus of the sending side is specified, determination is made whether the telephone line connected to the sender's facsimile apparatus is busy or not due to another transmission job or a reception job (S1). When the telephone line of the transmitter side is busy (during transmission or reception) (S1: YES), determination is made whether electronic mail associated with the relevant facsimile document is transmitted or not (S2). When electronic mail is not transmitted (S2: NO), the facsimile document with an ID added thereto is transmitted to the mail address of the recipient as electronic mail (S3). Then, control returns to S1. The image data of the facsimile document is converted into text data and transmitted as the body, message of the electronic mail, as described before. When electronic mail is already sent (S2: YES), control returns to S1. The aforementioned ID is specific for each facsimile document.

When the telephone line of the sender is not busy (S1: NO), control proceeds to S5. An ID is assigned to the facsimile number and the telephone number of the recipient is dialed (redialed). Here, facsimile transmission is attempted. Determination is made whether the telephone line of the recipient is busy or not (S6).

When the telephone line of the recipient is busy (S6: YES), determination is made whether the electronic mail associated with the present facsimile document is already transmitted or not (S7). When the electronic mail is not transmitted (S7: NO), an ID is assigned to the facsimile document. The facsimile document is transmitted to the mail address of the recipient as electronic mail (S8). Then control returns to S5. When the electronic mail is already transmitted (S7: YES), control returns to S5.

When the telephone line of the recipient is not busy (S6: NO), determination is made whether the electronic mail is already transmitted or not (S9). When the electronic mail is already sent (S9: YES), the ID added to the facsimile document in transmitting the electronic mail at S3 and S8 is transmitted to the facsimile apparatus of the receiver side (S10). When the electronic mail is already received at the facsimile apparatus of the recipient, notification is made of the reception (refer to FIG. 5A). Then, determination is made whether there is notification of reception of electronic mail from the recipient (S11). When there is notification of reception of the electronic mail from the recipient (S11: YES), the main routine ends. When there is no notification of reception of the electronic mail from the recipient (S11: NO), the image data of the facsimile document is transmitted through the telephone line (S12). Then, the present routine ends.

When electronic mail is not transmitted from the facsimile apparatus of the sender side (S9: NO), the processes of S10 and S11 are skipped. The image data of the facsimile document is transmitted through the telephone line (S12), and the present routine ends. At S12, the ID is also transmitted.

When the telephone line of the sender side or the receiver side is busy, the facsimile document is transmitted as electronic mail through the Internet leased line from the facsimile apparatus of the sender to the facsimile apparatus of the receiver. When both the telephone lines of the sender and the receiver are not busy, the facsimile document is transmitted from the facsimile apparatus of the sender to the facsimile apparatus of the receiver through the telephone line.

FIG. 5A is a flow chart showing the control procedure of the receiver's facsimile apparatus in receiving image data of the facsimile document with an ID through the telephone line. FIG. 5B is a flow chart showing the control procedure of the receiver's facsimile apparatus in receiving image data of facsimile document with an ID through the Internet leased line. The processes of FIGS. 5A and 5B respond to the processes of S3, S8, S10, and S12 of the sender's facsimile apparatus of FIG. 4.

In receiving image data of a facsimile document to which an ID is added through the telephone line according to FIG. 5A, the ID of a facsimile document from the sender's facsimile apparatus is received at the facsimile apparatus of the receiver's side (the process of S10 of FIG. 4). First, determination is made whether the image data of the facsimile document corresponding to the ID is already received or not (S21). When the image data is not received (S21: NO), image data is received (S22). Then, printing is carried out according to the image data (S23). When the image data is already received (S21: YES), notification is made to the facsimile apparatus of the sender that the image data is already received (S24). The present routine ends after the process of S23 or S24.

In receiving image data of a facsimile document to which an ID is added over the Internet leased line at the facsimile apparatus of the receiver side according to the flow chart of FIG. 5B, the facsimile document transmitted from the sender's facsimile apparatus (a process of S3 and S8 in FIG. 4) to the mail address of the recipient is received as electronic mail (S31). Determination is made whether the image data of the facsimile document corresponding to the received ID is received or not (S32). When the image data is not received (S32: NO), printout is carried out according to the image data (S33). When the image data is already received (S32: YES), the image data is discarded from memory unit 23 (S34). The present routine ends after the process of S33 and S34.

Thus, printing is carried out according to the image data of the facsimile document that first arrives at the facsimile apparatus of the recipient out of the facsimile document transmitted from the facsimile apparatus of the sender.

As described above, two communication lines of a telephone line and an Internet leased line are used in the communication of image data between two different facsimile apparatuses. Therefore, the same data can be sent at the same time through both of the two communication lines. Data can be communicated earlier than the conventional case where communication is carried out through only one line.

Print out of data received subsequently will not be carried out. Only printing of the first received data is carried out with respect to the same facsimile document at the receiver side. The problem of repeating printouts for the same facsimile document to use extra recording sheet is eliminated.

In the present embodiment, an image data communication system using particularly a telephone line and an Internet leased line is described. The present invention is also applicable to a communication system using two telephone lines or two Internet leased lines, and the like.

Second Embodiment

Figure 6:
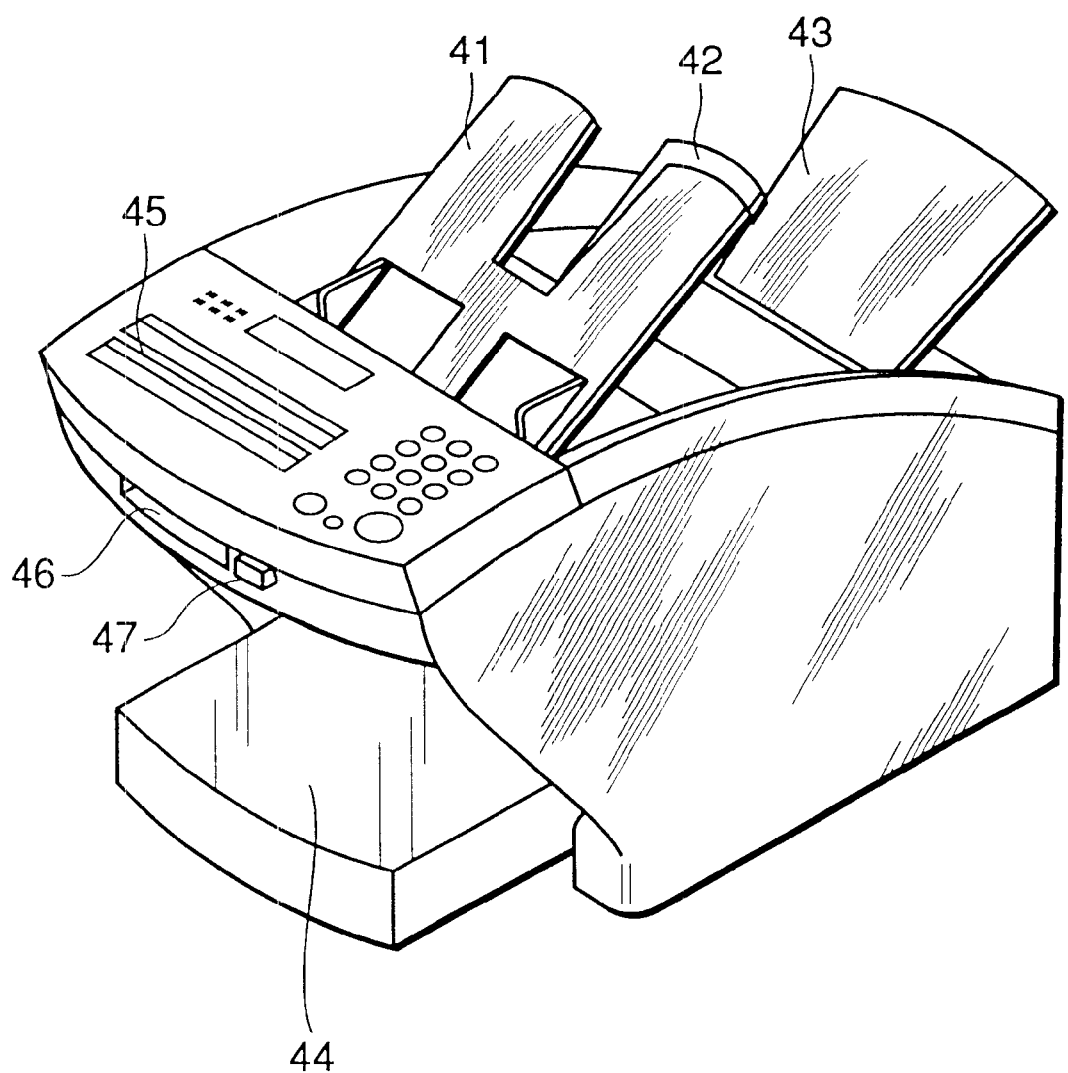
FIG. 6 shows an appearance of a facsimile apparatus according to a second embodiment of the present invention.

Referring to FIG. 6, a facsimile apparatus according to a second embodiment of the present invention includes a document feed tray 41 for conveying a document to be read out one sheet at a time to the reader, a document discharge tray 42 for discharging a document read out, a recording sheet discharge tray 43 for discharging a recording sheet on which the received data is printed out, a recording sheet feed tray 44 for supplying a sheet on which received data is to be printed out, an operation panel 45 for operating the facsimile apparatus, an external storage device inlet 46 for inserting a recording medium such as a floppy disk or a magneto-optical disk, and an external storage device output button 47 for taking out a recording medium.

Figure 7A:
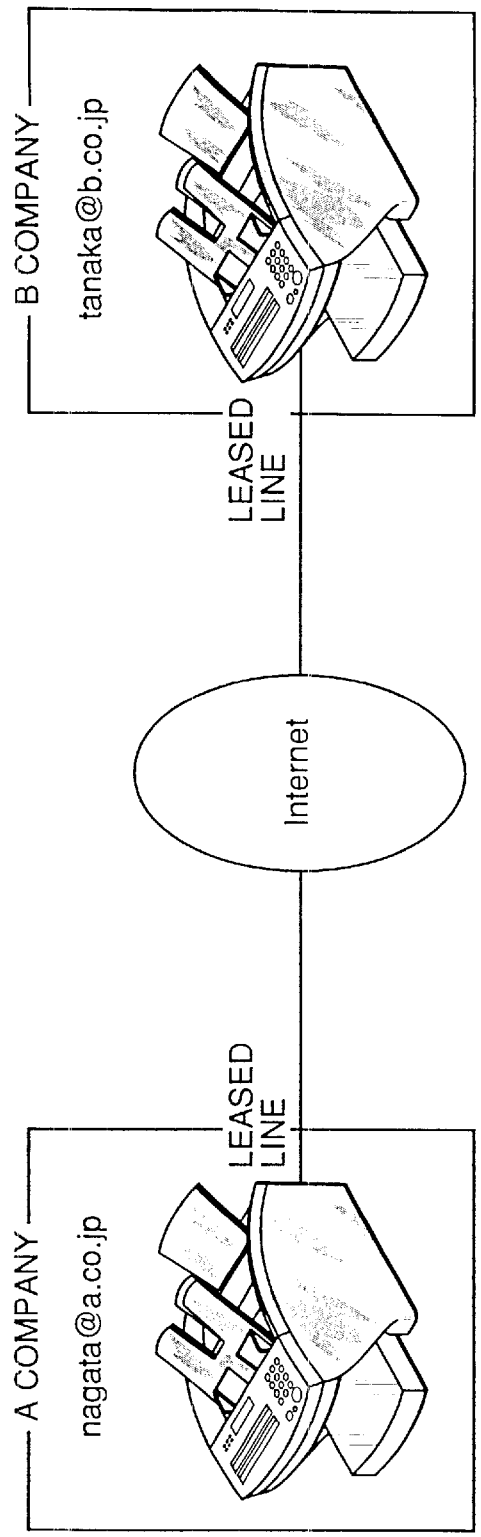
FIGS. 7A and 7B are diagrams for describing the method of connecting the facsimile apparatus of the second embodiment to the Internet.
Figure 7B:
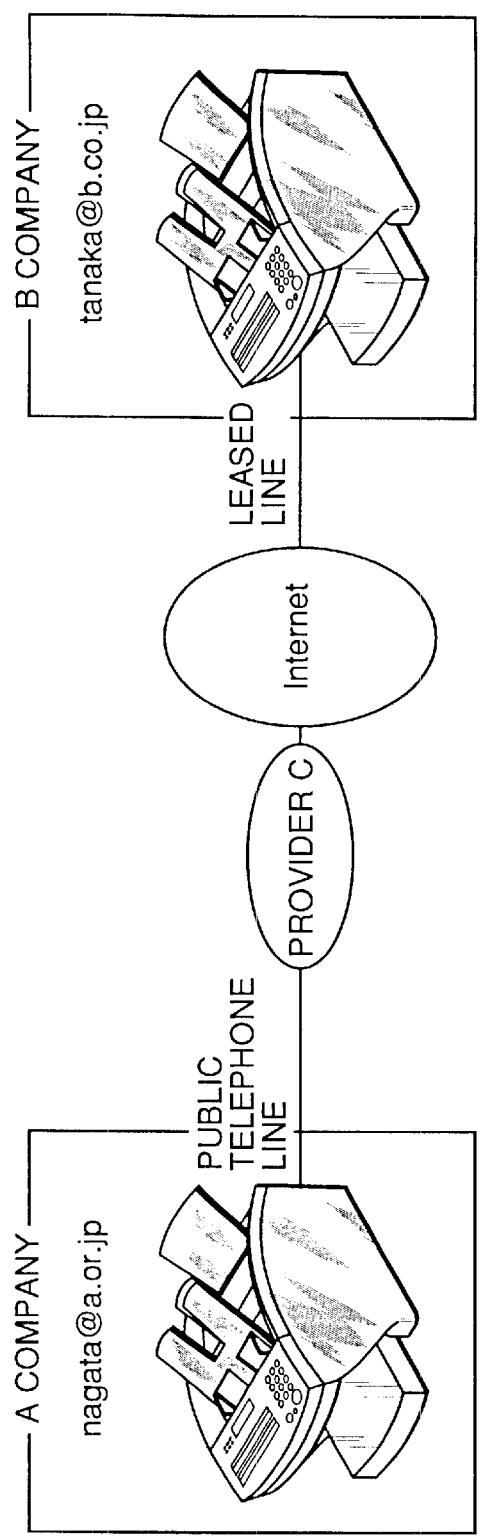

FIGS. 7A and 7B show examples of connection of facsimile apparatuses. Referring to FIG. 7A, a facsimile apparatus installed at a company A with an E-mail address of nagata@a.co.jp and a facsimile apparatus installed at a company B with an E-mail address of tanaka@b.co.jp are connected to the Internet via a leased line.

Referring to FIG. 7B, a facsimile apparatus installed at A company with the E-mail address of nagata@a.or.jp is connected to a public telephone line and the Internet via a provider c, and a facsimile apparatus installed at B company with the E-mail address of tanaka@b.co.jp is connected to the Internet via a leased line.

Figure 8:
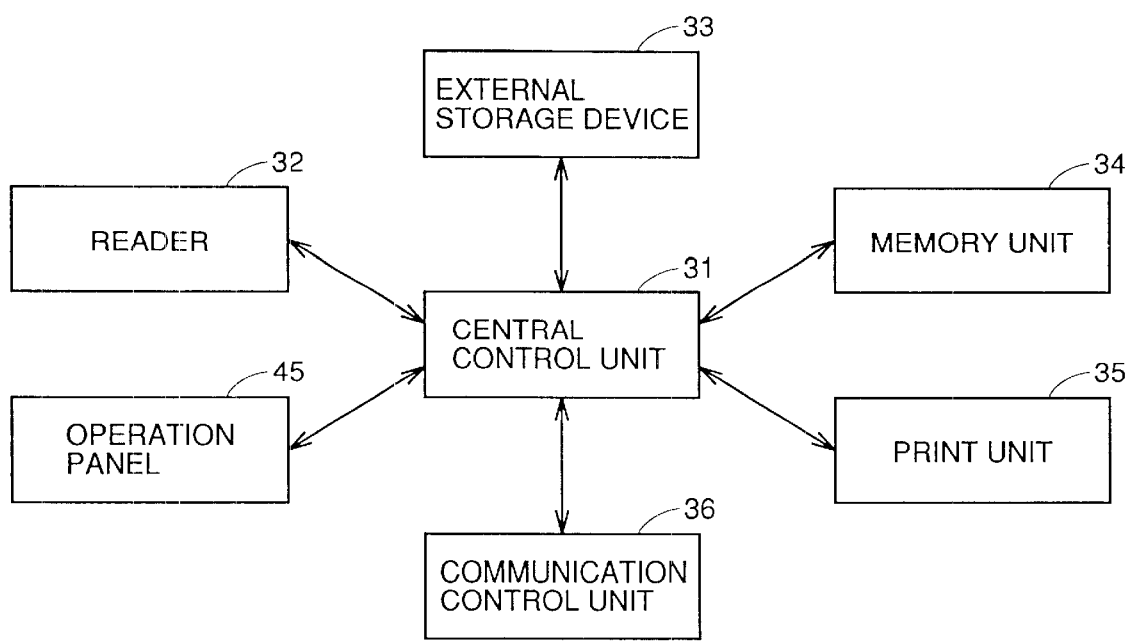
FIG. 8 is a block diagram showing the schematic structure of the facsimile apparatus of the second embodiment.

Referring to FIG. 8, a facsimile apparatus of the second embodiment includes an operation panel 45 for manipulation of the facsimile apparatus, a central control unit 31 for providing the overall control of the facsimile apparatus, a reader 32 for reading out an image from a document, an external storage device 33 for storing decoded binary data, a memory unit 34 for storing a control program, received data, and the like, a print unit 35 for printing out received image data on a recording sheet, and a communication control unit 36 connected to the Internet for transmission/reception of electronic mail (referred to as E-mail hereinafter).

Memory unit 34 includes image data of a facsimile document, and a program for applying a predetermined process on a binary file. According to this program, central control unit 31 executes a process of applying a predetermined process on the image data of the facsimile document and on the binary file.

Figure 9:
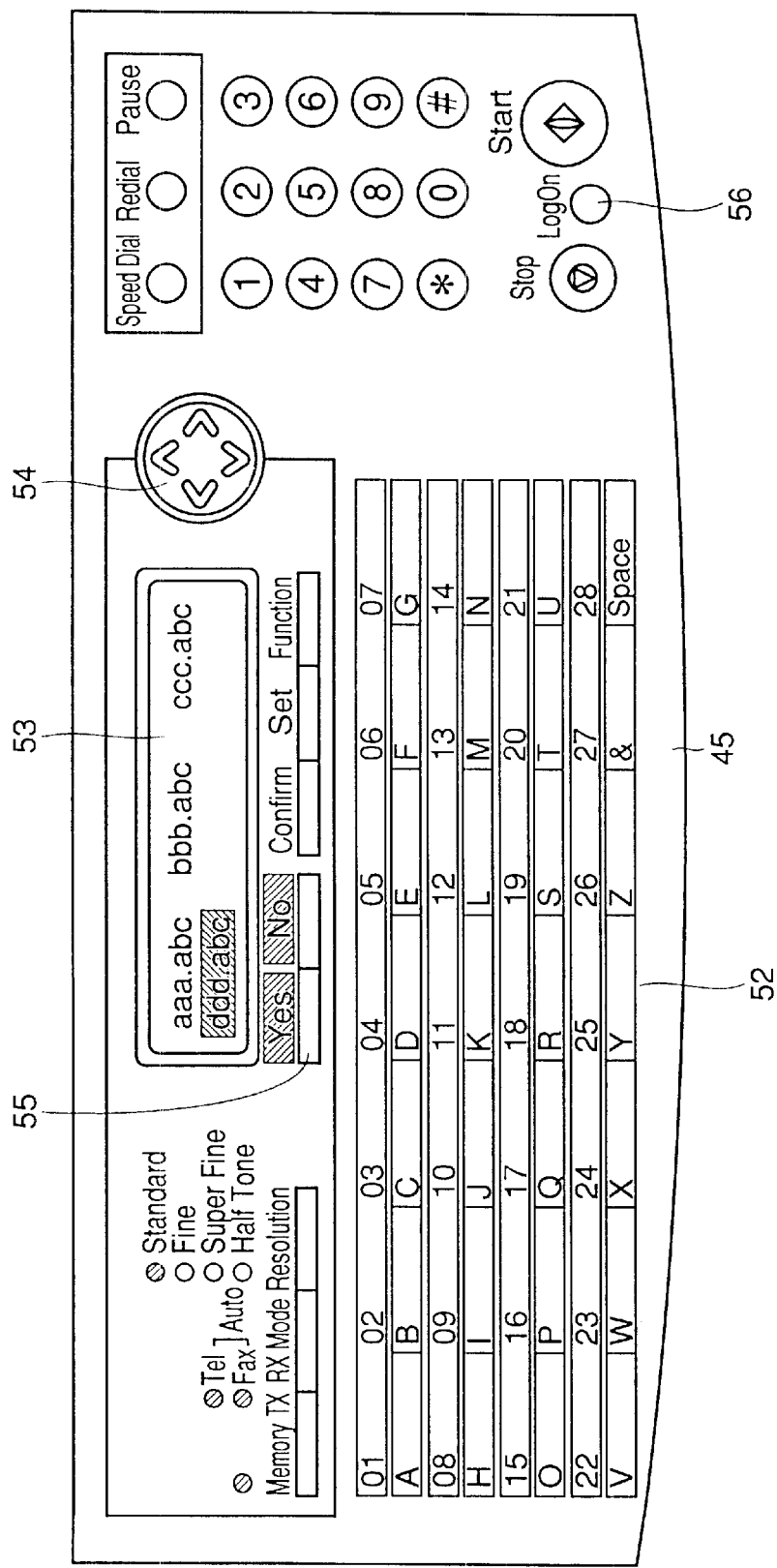
FIG. 9 is a top view of an operation panel of the facsimile apparatus of the second embodiment.

Referring to FIG. 9, operation panel 45 includes a one-touch dial key 52 registered with an E-mail address, a display unit 53 for displaying a binary file name and the like, a cursor key 54 for shifting the cursor on display unit 53, a Yes key 55 to respond to a message on display unit 53, and a log-on key 56 to log on to the Internet.

Figure 10:
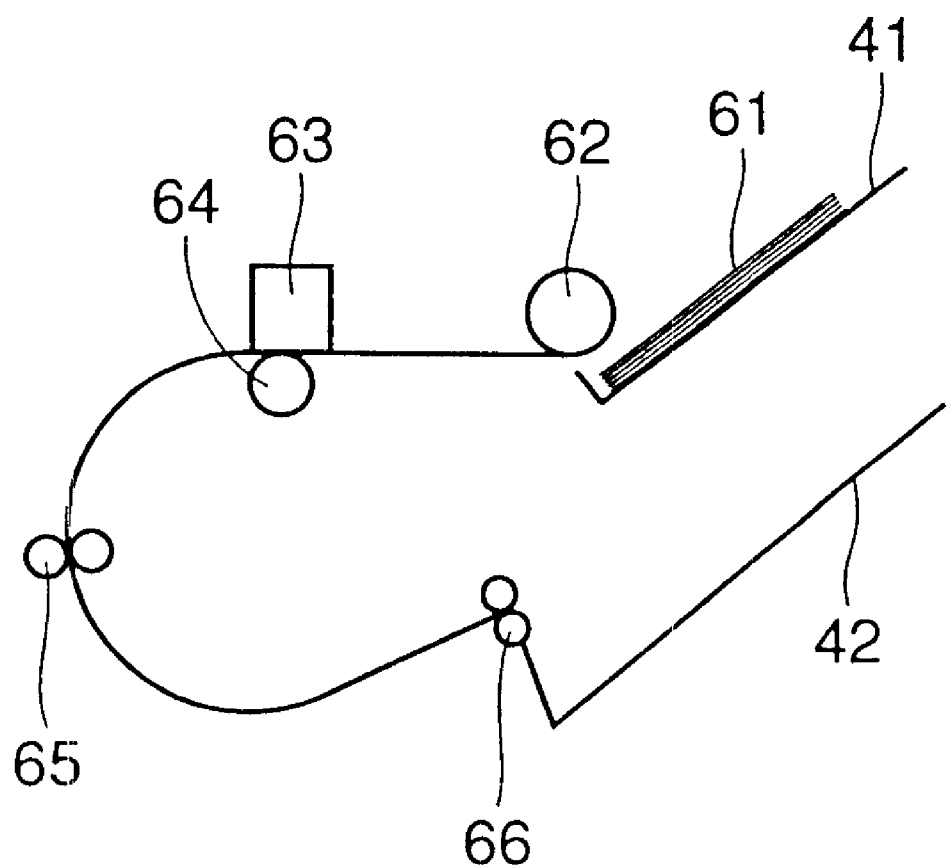
FIG. 10 shows a schematic structure of a reader 32 according to the second embodiment.

Referring to FIG. 10, reader 32 includes a document feed tray 41 on which a document 61 is to be set, a feed roller 62 for feeding the document set on document feed tray 41 one sheet by one, an image sensor 63 for reading the image of the fed document, a read roller 64 for moving the document when image sensor 63 reads out an image from the document, a transport roller 65 for transporting the document that is already read out, a discharge roller 66 for discharging the read out document, and a document discharge tray 42 to which a read out document is discharged.

In general, only text data can be transmitted or received through the E-mail of the Internet. In transmitting/receiving data other than text data such as graphic data and binary data generated by a word processor or through a spreadsheet software, the binary file can be encoded into text data to be transmitted/received in the form of a file attached to the E-mail. As the procedure to encode a binary file into text data, softwares such as Base64, BinHex, and uuencode are generally used. In the facsimile apparatus of the present invention, the binary file and the document image converted into a particular format are encoded into text data by such softwares to be transmitted in the form of an attachment file of the E-mail. At the facsimile apparatus of the receiver side, the encoded text data is converted into a binary file and stored. The decoded binary data is stored in external storage device 33.

In receiving E-mail through the Internet, the facsimile apparatus accesses the mail server in which its own mail account is registered to confirm whether there is an E-mail message directed to its own E-mail address. When there is an E-mail message, the procedure of down loading from the mail server is carried out.

Figure 11:
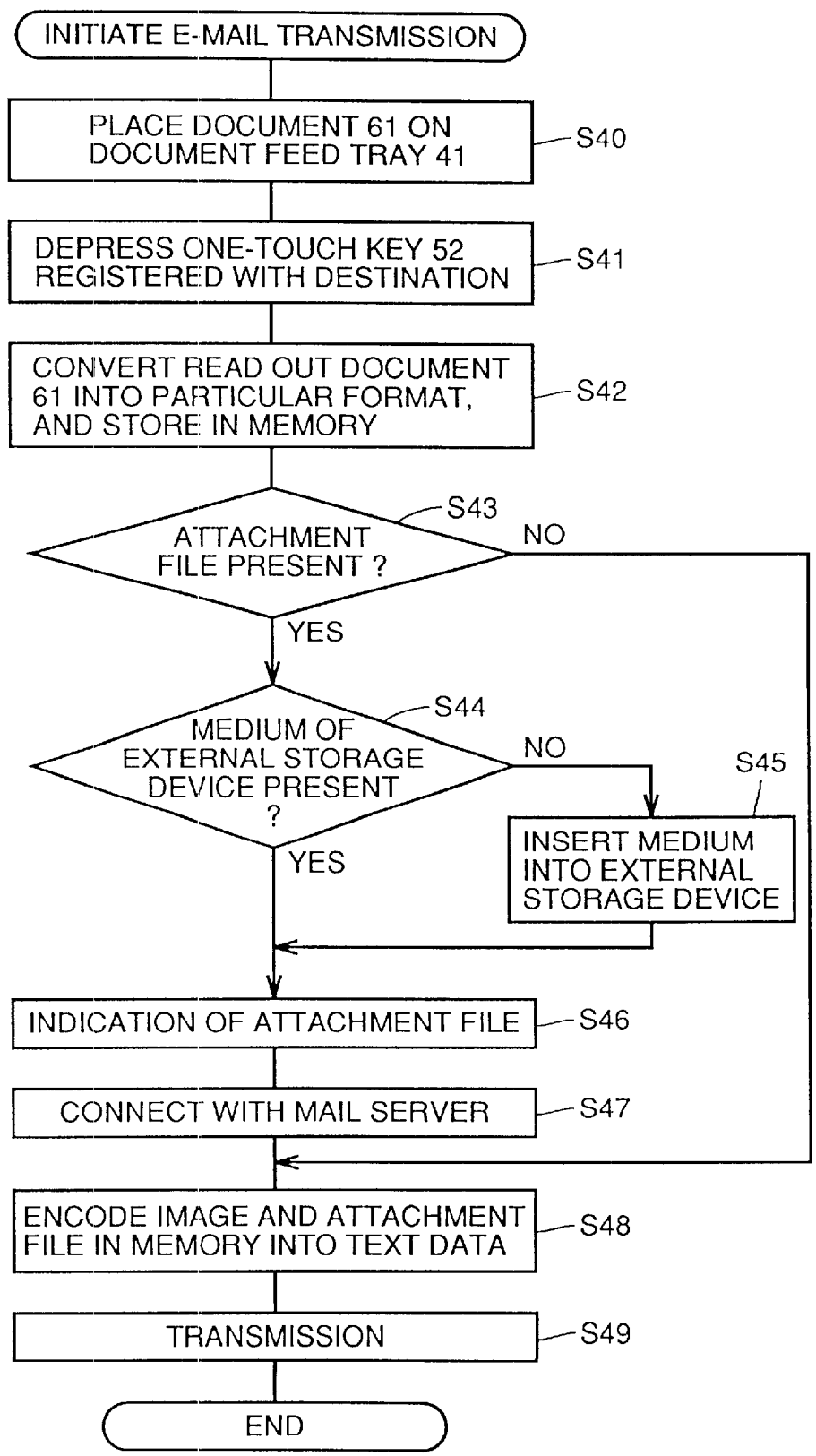
FIG. 11 is a flow chart showing the procedure of transmission of the facsimile apparatus of the second embodiment.

The transmission process of the facsimile apparatus according to the second embodiment will be described hereinafter with reference to the flow chart of FIG. 11. First, the operator sets a document 61 on document feed tray 41 (S40). The operator depresses one-touch dial key 52 that has the mail address of the recipient registered (S41). Document 61 set on document feed tray 41 is picked up by feed roller 62 to be transferred to image sensor 63. An image is read out from document 61. The image of the read out document 61 is converted photoelectrically to take a particular format (pict, TIFF, and the like) by central control unit 31 to be stored in memory unit 34 (S42).

When there is no attachment file to be transmitted at the same time (S43: NO), control proceeds to step S48. When there is an attachment file (S43: YES), determination is made whether there is a recording medium (floppy disk, magneto-optical disk, and the like) at external storage device 33 (S44). When there is no recording medium in external storage device 33 (S44: NO), the operator inserts a recording medium into external storage device 33 (S45).

Central control unit 31 reads out a file name from the recording medium inserted into external storage device 33 to display the file name on display unit 53 on operation panel 45. The operator selects the file to be attached through cursor key 54, and depresses Yes key 55 (S46).

Central control unit 31 is connected to the mail server on the Internet under control of communication control unit 36 (S47). Central control unit 31 reads out the image of document 41 that is converted into a particular format and stored in memory unit 34. Then, central control unit 31 encodes the binary file stored in the recording medium in external storage device 33 designated by the operator and the document image converted into a particular format into text data according to the method specified at the time of initialization (S48). Central control unit 31 attaches the encoded data to the E-mail (document image converted into a particular format) to carry out transmission. When the transmission is completed, connection with the mail server is cut off (S49).

More specifically, the transmitted E-mail includes image data of a particular format converted into text data as the body message, and the encoded binary file converted into text data as an attachment file.

The above description applies to the case where a facsimile apparatus is connected to the Internet through a leased line shown in FIG. 7A. When the facsimile apparatus is connected to the Internet via a provider c as shown in FIG. 7B, provider c is dialed prior to connection with the mail server. Transmission is initiated after logging in. In this case, the script for connection with the telephone number of the provider and the E-mail address of the recipient are registered by one-touch dial key 52.

Figure 12:
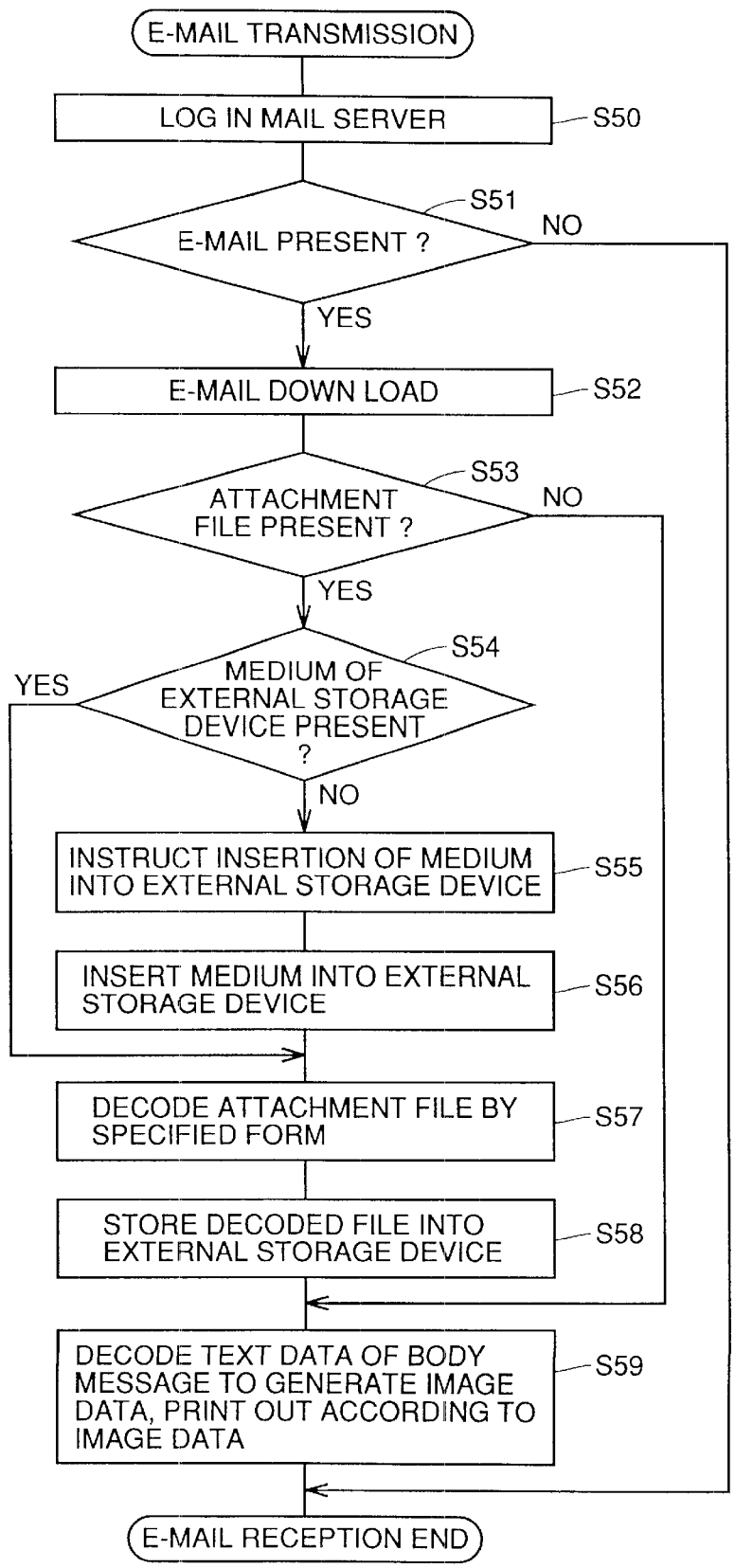
FIG. 12 is flow chart showing the procedure of reception of the facsimile apparatus according to the second embodiment of the present invention.

FIG. 12 corresponds to the reception process of the facsimile apparatus. First, the facsimile apparatus logs in to the mail server on the Internet (S50). Determination is made whether there is an E-mail message directed to its own address.

When there is no E-mail transmission to its own address (S51: NO), the process ends. When there is an E-mail transmission sent to its own address (S51: YES), that E-mail transmission is downloaded and stored in memory unit 34 (S52).

When there is no file attached to the received E-mail (S53: NO), control proceeds to step S59. When there is a file attached to the E-mail (S53: YES), determination is made whether a recording medium is inserted into external memory device 33 (S54).

When a recording medium is inserted into external memory device 33 (S54, YES), control proceeds to step S57. When a recording medium is not inserted into external storage device 33 (S54: NO), the operator is instructed to insert a recording medium into external storage device 33 (S55). Upon inserting a recording medium into external storage device 33 (S56), control proceeds to step S57.

Central control unit 31 reads out the E-mail temporarily stored in memory unit 34 and decodes the attachment file into a predetermined form (S57). The decoded data is stored into the recording medium of external storage device 33 (S58). The text data of the body message of the E-mail is converted into image data. Instruction is provided to print unit 35 to print out the image data. Print unit 35 picks up a recording sheet from recording sheet feed tray 44 to print out the image data. The printed out sheet is discharged to recording sheet discharge tray 43 (S59).

When the facsimile apparatus lacks the function of a decoder of the encoded format, the attachment file is recorded on the recording medium in external storage device 33 in the intact encoded state. The data recorded on the recording medium can be returned to the former binary data with a utility software for decoding by reading out the data through a personal computer.

The log-in timing of the facsimile apparatus to the mail server on the Internet at the time of reception is constant. That constant cycle can be set at an interval of several ten minutes. The facsimile apparatus can also be logged on to the mail server on the Internet manually by depressing log-on key 56.

The facsimile apparatus of the second embodiment can be connected to the Internet to store the binary file attached to the E-mail in an external storage device. Also, the binary file can be encoded and transmitted as an annex to the E-mail together with the image data.

Third Embodiment

A facsimile apparatus according to a third embodiment of the present invention has an appearance similar to that of the second embodiment shown in FIG. 2. Therefore, detailed description thereof will not be repeated.

Figure 13:
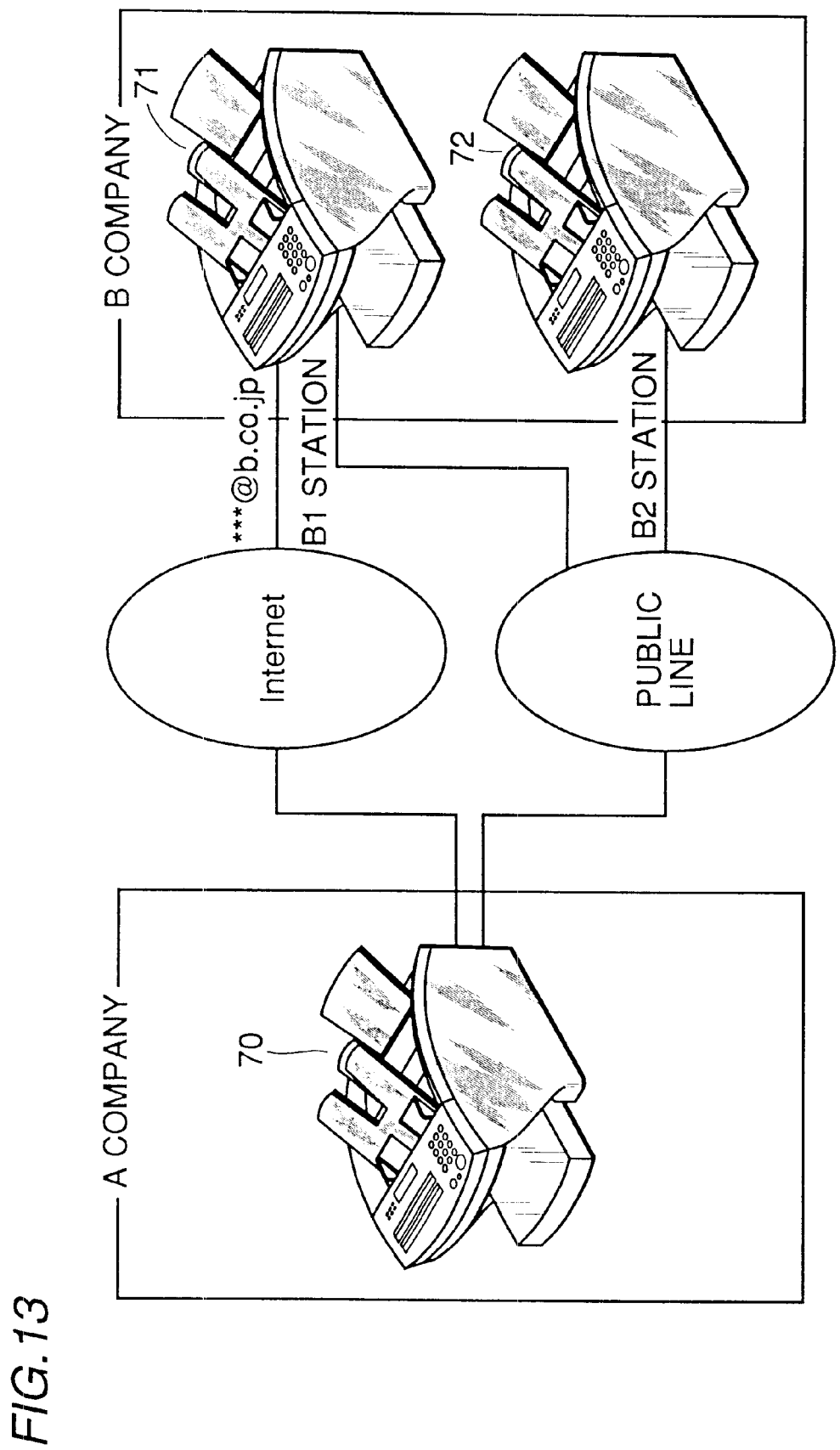
FIG. 13 is a diagram for describing the method of connecting facsimile apparatuses according to the third embodiment of the present invention.

Referring to FIG. 13, a facsimile apparatus 70 of the present embodiment installed in A company is connected via the Internet to a facsimile apparatus 71 installed at B company and having an E-mail address of ***@b.co.jp. Facsimile apparatus 70 installed at A company is also connected to facsimile apparatus 71 of B company through a public line.

Furthermore, facsimile apparatus 70 of A company is also connected via a public line to a facsimile apparatus 72 installed at B company and that does not support the Internet.

Figure 14:
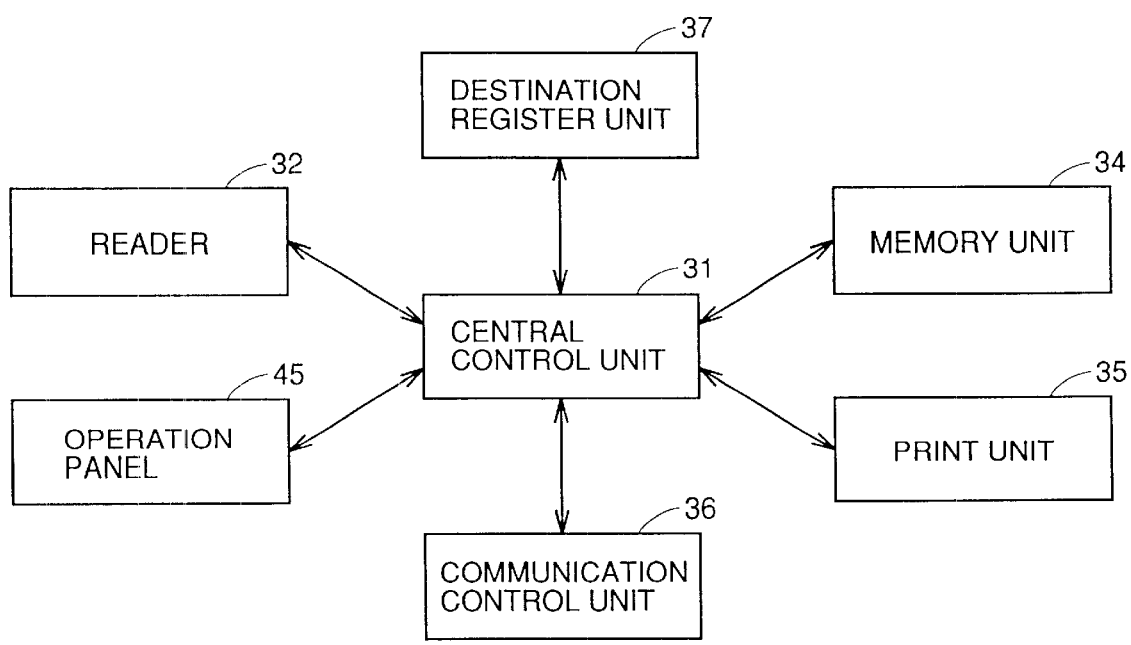
FIG. 14 is a block diagram showing a schematic structure of a facsimile apparatus according to the third embodiment.

Referring to FIG. 14, the facsimile apparatus of the third embodiment includes an operation panel 45 for carrying out manipulation of the facsimile apparatus, a central control unit 31 for providing the overall control of the facsimile apparatus, a reader 32 for reading out an image from a document, a destination register unit 37 for registering a Fax number and an E-mail address at the one-touch dial key provided at operation panel 45, a memory unit 34 for storing a control program, received data, and the like, a print unit 35 for printing out the received image data on a recording sheet, and a communication control unit 36 connected to the Internet and the public line for transmitting/receiving data.

Memory unit 34 includes a program for applying a predetermined process on the image data of a facsimile document. Using this program, central control unit 31 carries out a process to apply a predetermined process on the image data of the facsimile document.

Figure 15:
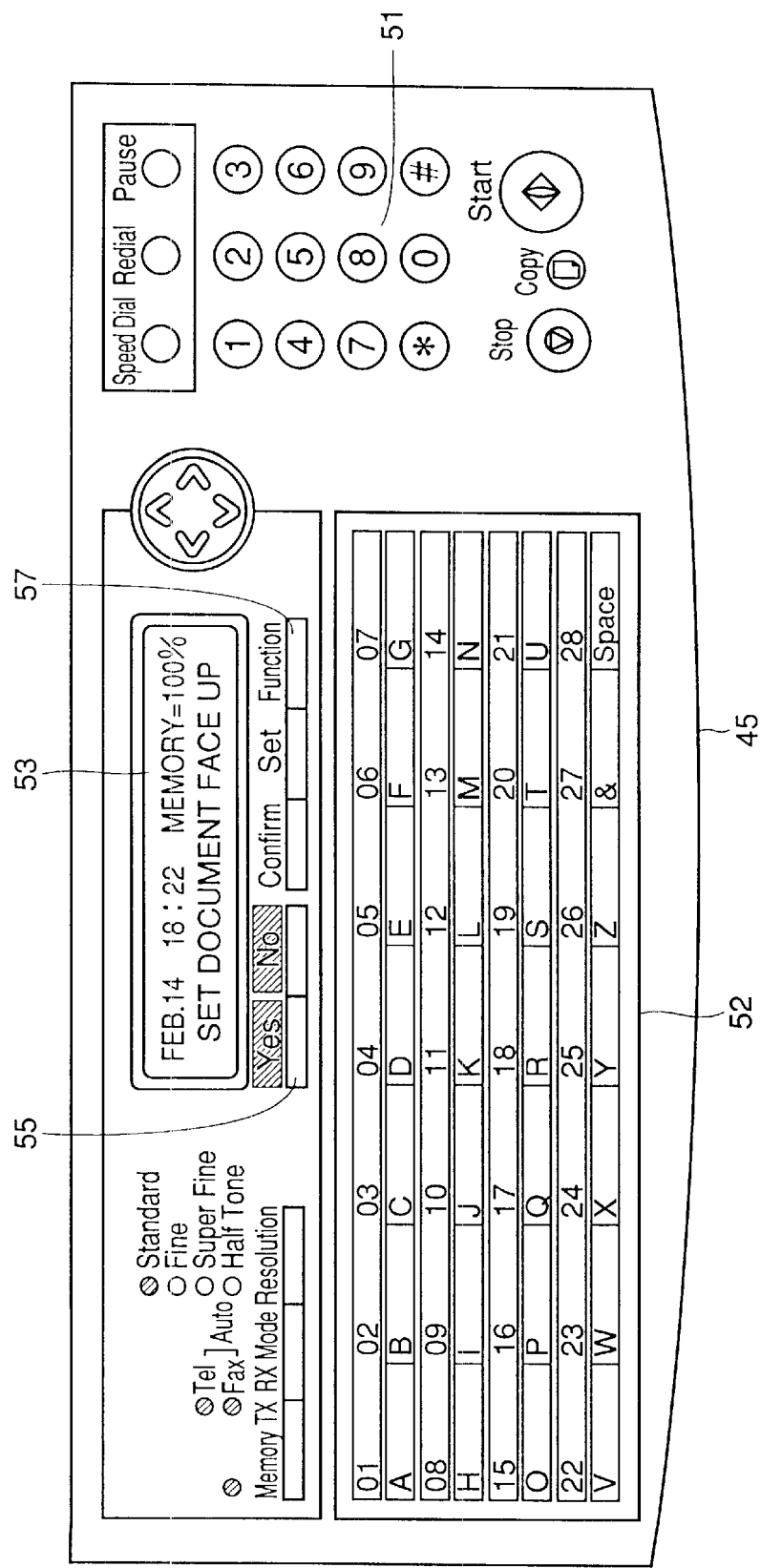
FIG. 15 is a top view of an operation panel of the facsimile apparatus of the third embodiment.

Referring to FIG. 15, operation panel 45 includes a ten-key 51 used in registering the Fax number and the E-mail address, a one-touch dial key 52 to which a Fax number and an E-mail address are registered, a display unit 53 for displaying a message and the like to the user, a set key 57 used in the registration of one-touch dial key 52, and a Yes key 55 to respond to a message provided on display unit 53.

Reader unit 32 is identical to that of the second embodiment shown in FIG. 10. Therefore, description thereof will not be repeated.

Figure 16:
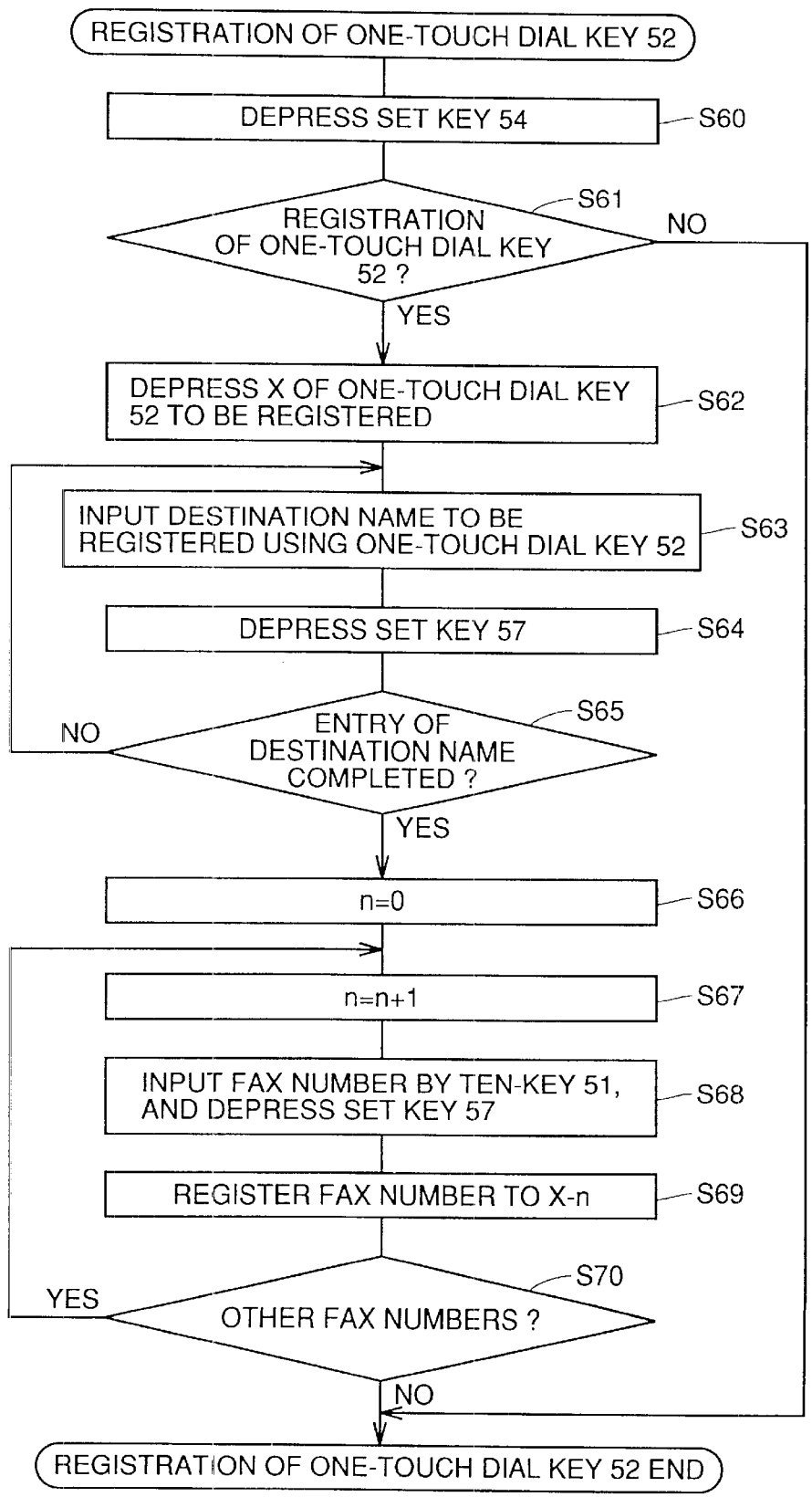
FIG. 16 is a flow chart showing the procedure of registration of a one-touch dial key of the facsimile apparatus of the third embodiment.

The registration procedure of one-touch dial key 52 of the facsimile apparatus according to the third embodiment will be described hereinafter with reference to the flow chart of FIG. 16. When the operator depresses set key 57 (S60), a message is provided on display unit 53 on operation panel 45 confirming registration of the one-touch dial key. If the operator does not depress the Yes key 55 (S61: NO), the registration procedure of one-touch dial key 52 is terminated.

When the operator depresses Yes key 55 (S61: YES), a message is provided prompting depression of a relevant one-touch dial key 52 to be registered. The operator depresses an appropriate one-touch dial key 52 to be registered (S62) to initiate registration. In the case of registration of one-touch dial key 52 of the number 01, depression of one-touch dial key 52 of the number 01 causes a message to be displayed on display unit 53 to prompt entry of the name of the recipient to be registered. The operator enters the name through the alphabets allotted to one-touch dial key 52 (S63). Here, it is assumed that B company is selected as the party to receive the transmission.

Following entry of the name of the recipient, the operator depresses set key 57 again (S64). A message is provided on display unit 53 indicating whether entry of a recipient name is completed or not. When entry of a recipient name is not completed (S65: NO), control returns to step S63 to repeat the entry process of a recipient name. When the entry of a recipient name is completed, the operator depresses Yes key 55 (S65: YES).

Then, 0 is substituted for n (S66), and n+1 is substituted for n (S67). The operator enters the Fax number or the E-mail address of the recipient using ten-key 51 on operation panel 45 and depresses set key 57 (S68). For example, by entering the Fax number of "B1 station" and depressing set key 57, registration is made as "01-1" as the first item of number 01 of one-touch dial key 52 (S69). Then, a message is provided on display unit 53 asking whether there is still a Fax number to be registered. When there is still a Fax number to be registered (S70: YES), control returns to step S67 to repeat the above-described process.

For example, when transmission is to be sent to B company shown in FIG. 13, the "B2 station" of facsimile apparatus 72 is registered as "01-2" of one-touch dial key 52. Since facsimile apparatus 71 is also connected to the Internet, the E-mail address thereof "***@b.co.jp" is registered as "01-3" of one-touch dial key 52. When the input of a Fax number to be registered is completed (S70: NO), the registration process of one-touch dial key 52 is completed. The recipient name, Fax number, and E-mail address set by the above-described registration process is registered into destination register unit 37.

The E-mail address is registered into destination register unit 37 to be the last of the "01-n" independent of the input sequence of the Fax number and the E-mail address. This "n" indicates the priority regarding the same destination. A smaller value of n represents higher priority.

Figure 17:
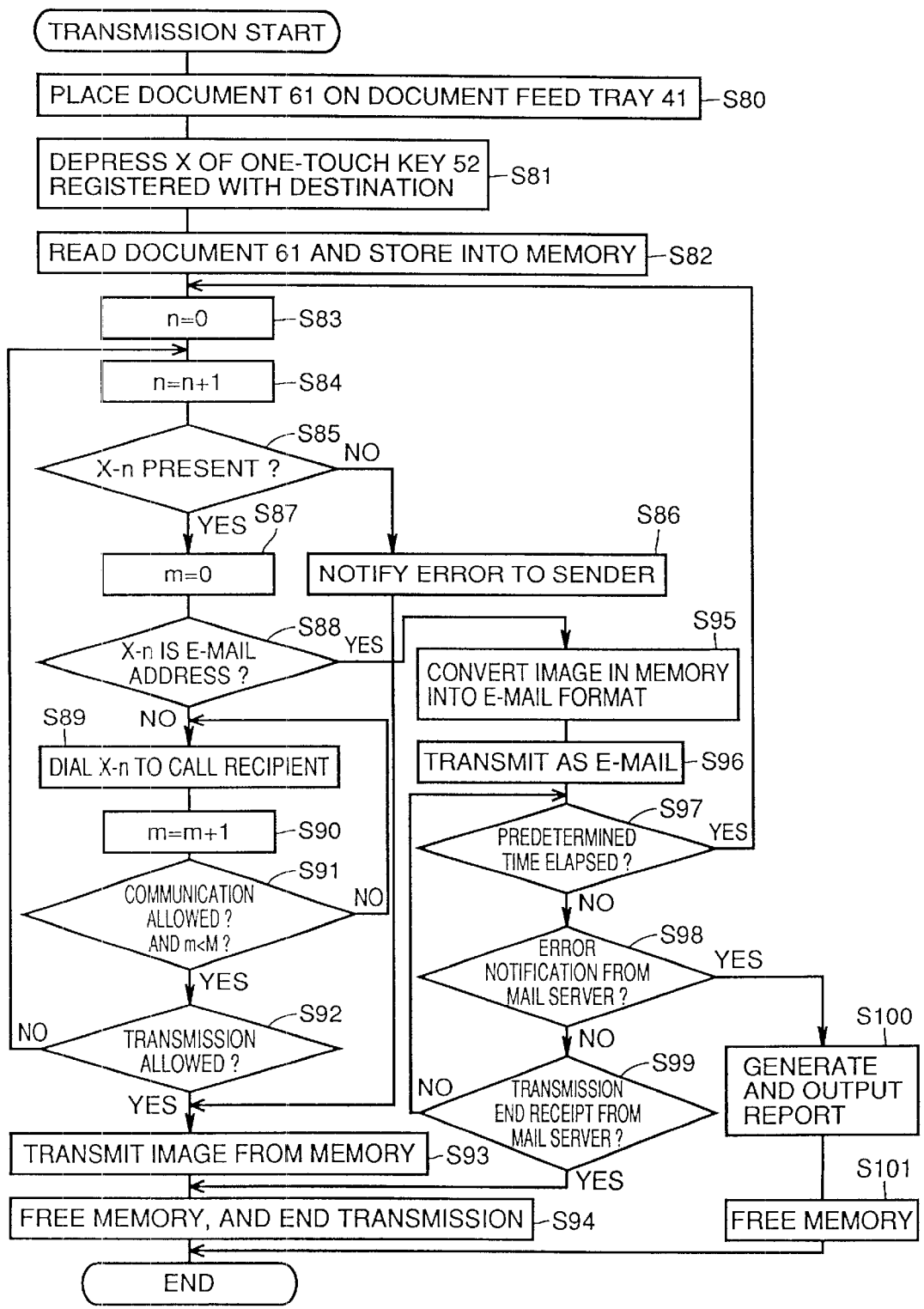
FIG. 17 is a flow chart showing a procedure of transmission of the facsimile apparatus of the third embodiment.

FIG. 17 is a flow chart of the transmission procedure of the facsimile apparatus of the present embodiment. Document 61 is set on document feed tray 41 of the facsimile apparatus (S80). The operator depresses "X" of one-touch key 52 to which the destination is registered (S81). For example, the key of number 01 of one-touch dial key 52 is depressed when transmission is to be sent to B company shown in FIG. 13.

Document 61 has its image read out by reader 32. The image data is stored in memory unit 34 by central control unit 31 (S82).

Then, 0 is substituted for n (S83), and n+1 is substituted for n (S84). Determination is made whether a Fax number or an E-mail address is registered to "x-n" of one-touch dial key 52. When neither a Fax number nor an E-mail address is registered to "x-n" of one-touch dial key 52 (S85: NO), the sender is notified of an error such as by a message on display unit 53 (S86). Then control proceeds to step S93.

When a Fax number or an E-mail address is registered to "x-n" of one-touch dial key 52 (S85: YES), 0 is inserted into m (S87). Determination is made whether "x-n" is an E-mail address (S88).

When "x-n" is not an E-mail address (S88: NO), "x-n" which is a Fax number is dialed by communication control unit 36 to call the receiver side (S89). For example, the "B1 station" of facsimile apparatus 71 of B company is dialed when X=1, n=1. Then, m+1 is substituted for m (S90).

When m is smaller than a predetermined value M in the case where the line of the recipient's facsimile apparatus is busy or communication is disabled by error and the like (S91: NO), control returns to step S89 to repeat the process.

When communication is not possible and m is equal to M, or when communication with the recipient's facsimile apparatus is possible (S91: YES), determination is made whether transmission to the recipient's facsimile apparatus is possible or not (S92).

When transmission to the recipient's facsimile apparatus is not possible (S92: NO), control returns to step S84 to repeat the subsequent process. When transmission to the recipient's facsimile apparatus is possible (S92: YES), control proceeds to step S93 to transmit the image data stored in memory unit 34.

When "x-n" is an E-mail address (S88: YES), the image data stored in memory unit 34 is converted into the E-mail format (S95). "Return-Receipt-To:" is added to the header of the E-mail to be transmitted and dispatched over the Internet (S96). By this transmission of the E-mail with "Return-Receipt-To:" at the header, a receipt is sent from the mail server when the facsimile apparatus of the destination side receives the E-mail from the mail server. Therefore, reception of the E-mail at the recipient's facsimile apparatus can be confirmed.

Then, determination is made of an elapse of a predetermined period of time (S97). At the elapse of a predetermined time (S97: YES), control returns to step S83 to repeat the above-described process. When the predetermined time has not yet elapsed (S97: NO), determination is made whether there is notification of an error from the mail server on the Internet (S98). When there is an error notification from the mail server (S98: YES), a report indicating that the transmission was not completed is generated and output (S100). The memory unit 34 is freed (S101), and the process ends.

When the E-mail address registered at one-touch dial key 53 is wrong, a receipt indicating "Returned mail: Host unknown" or "Returned mail: User unknown" may be transmitted from the mail server. In this case, a report indicating that registration of one-touch dial key 53 is wrong is generated and output at step S100.

When there is no error notification from the mail server (S98: NO), determination is made whether a transmission end receipt is received from the mail server (S99). When a transmission end receipt is not received from the mail server (S99: NO), control returns to step S97 to repeat the above-described process. When a transmission end receipt is sent from the mail server (S99: YES), memory unit 34 is freed since the transmission has been completed properly (S94). Thus, the transmission procedure ends.

Figure 18:
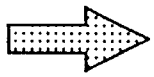
FIG. 18 shows an example of adding registration of a one-touch dial key of the facsimile apparatus of the third embodiment.

FIG. 18 shows an example of adding a Fax number registration to one-touch dial key 52. It is appreciated from the left side of FIG. 18 that "01-1"~"01-4" are registered at one-touch dial key 01. By adding the Fax number of "03-3*-1237", this number will be registered above the E-mail address of "*@b.co.jp." as in the right side of FIG. 18. The E-mail address of "***@b.co.jp." is re-registered at "01-5".

Registration is made so that the E-mail address is assigned the lowest priority. Transmission of E-mail via the Internet is taken as the final means. The reason why the E-mail transmission via the Internet is not given higher priority is due to the fact that the time of reception cannot be predicted since the E-mail is transmitted through an indefinite server.

In the case where the E-mail transmission as the final means is not completed, the failure of transmission can be notified through an error report or audibly through a loudspeaker.

According to the facsimile apparatus of the present embodiment, reliable identification can be made whether transmission to a recipient's facsimile apparatus was effected or not in the E-mail transmission when transmission to a desired Fax number was not allowed. A facsimile apparatus superior in operability can be provided.

Fourth Embodiment

The facsimile apparatus according to a fourth embodiment of the present invention has an appearance similar to that of the facsimile apparatus of the second embodiment shown in FIG. 6. Therefore, details thereof will not be repeated.

Figure 19:
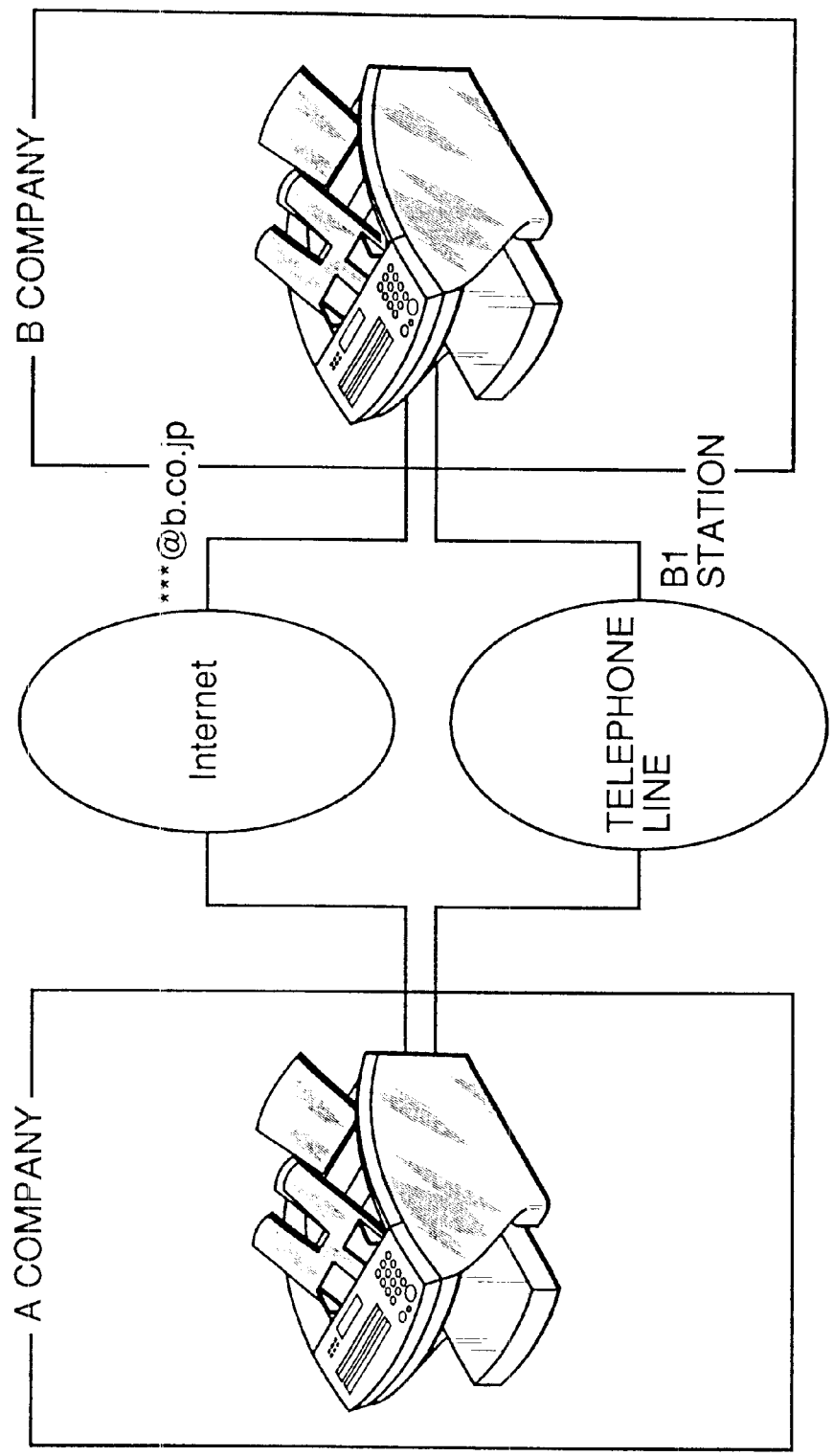
FIG. 19 is a diagram for describing the method of connecting facsimile apparatuses according to a fourth embodiment of the present invention.

In the fourth embodiment shown in FIG. 19, a facsimile apparatus installed at A company is connected through the Internet to a facsimile apparatus installed at B company having an E-mail address of "***@b.co.jp". The facsimile apparatus installed at A company is also connected to the same facsimile apparatus installed at B company having the Fax number of "B1 station".

Figure 20:
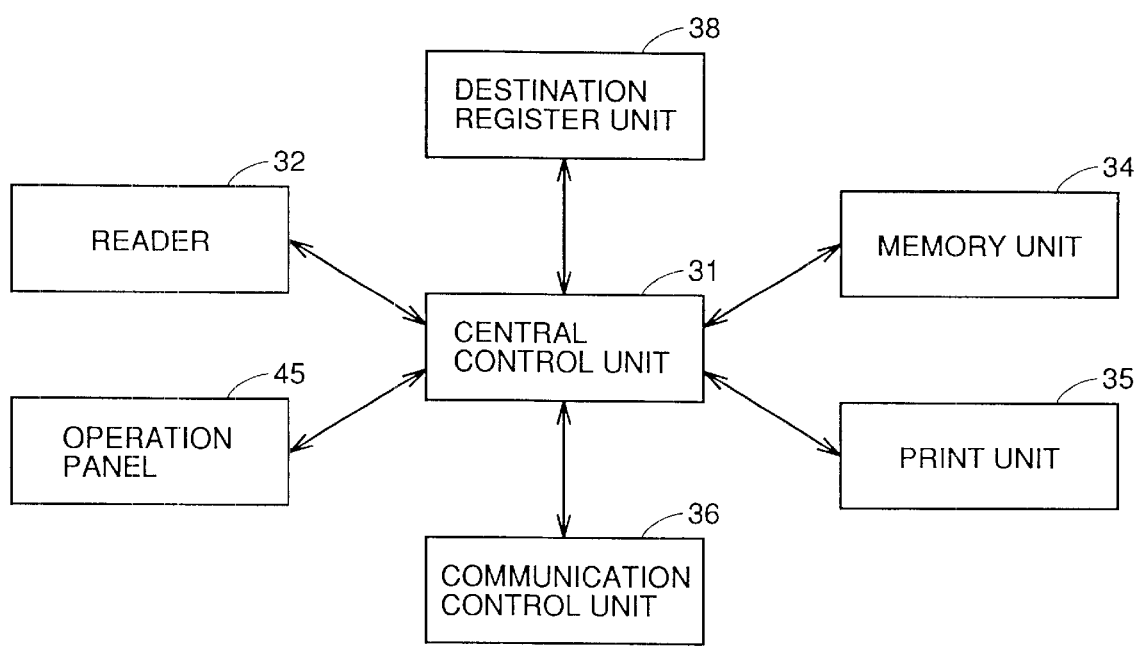
FIG. 20 is a block diagram showing a schematic structure of the facsimile apparatus of the fourth embodiment.

Referring to FIG. 20, the facsimile apparatus of the fourth embodiment includes an operation panel 45 for the manipulation of the facsimile apparatus, a central control unit 31 for providing the overall control of the facsimile apparatus, a reader 32 for reading out an image from a document, a destination register unit 38 for registering a Fax number and an E-mail address, a memory unit 34 for storing a control program, received data, and the like, a print unit 35 for printing out the received image data on a recording sheet, and a communication control unit 36 connected to the Internet and a telephone line to transmit/receive image data.

Memory unit 34 includes a program for applying a predetermined process on the image data of a facsimile document. Using this program, central control unit 31 executes the process of applying a predetermined process on the image data of a facsimile document.

Figure 21:
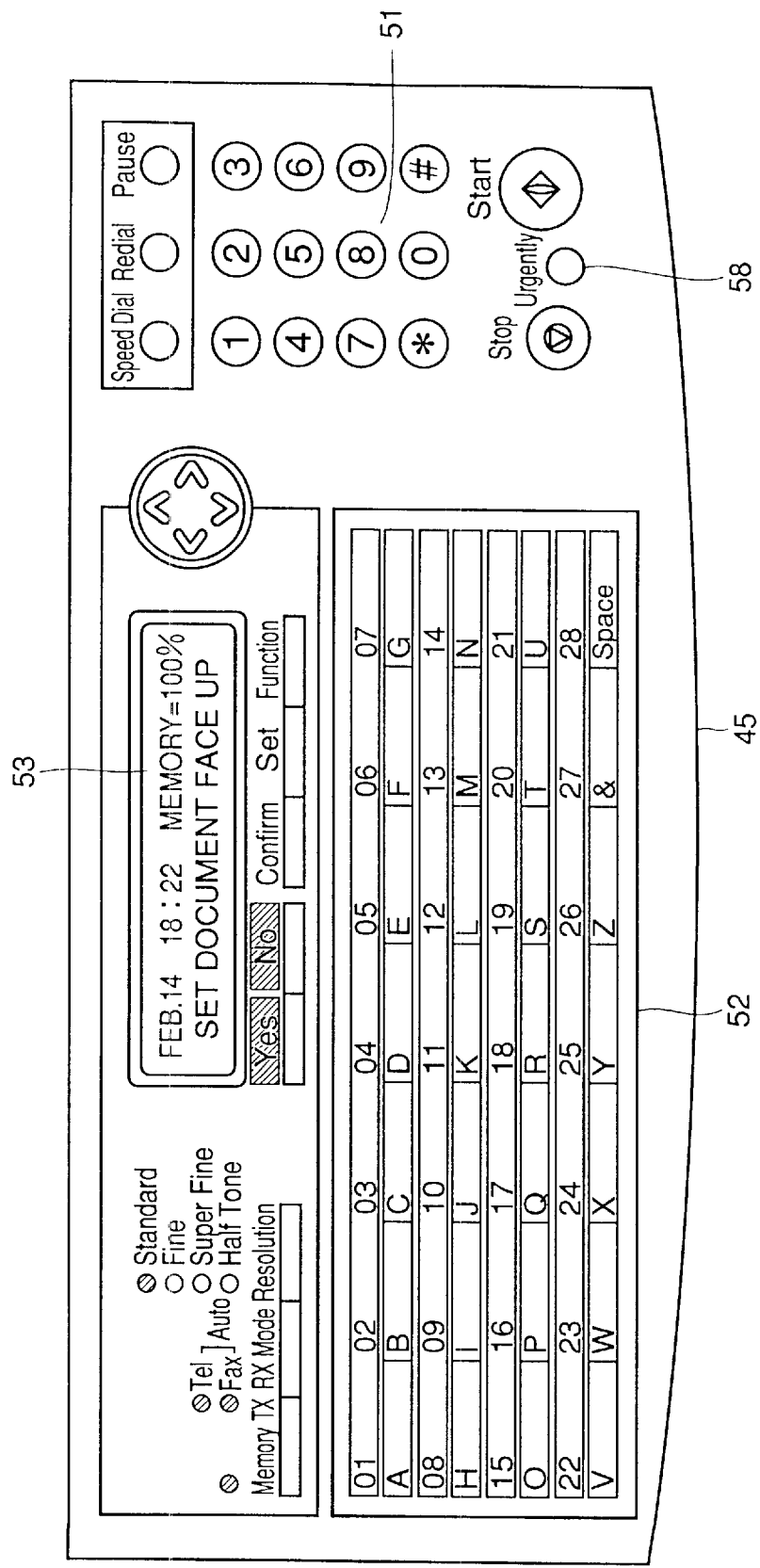
FIG. 21 is a top view of an operation panel of the facsimile apparatus of the fourth embodiment.

Referring to FIG. 21, operation panel 45 includes a ten-key 51 used for registering a Fax number or an E-mail address, a one-touch dial key 52 to which the Fax number and the E-mail address of a destination party are registered, a display unit 53 for providing a message, and a urgent key 58 for indicating urgent communication to the recipient.

In the fourth embodiment, reader 32 is identical to reader 32 described with reference to FIG. 10. Therefore, detailed description thereof will not be repeated.

Figure 22:
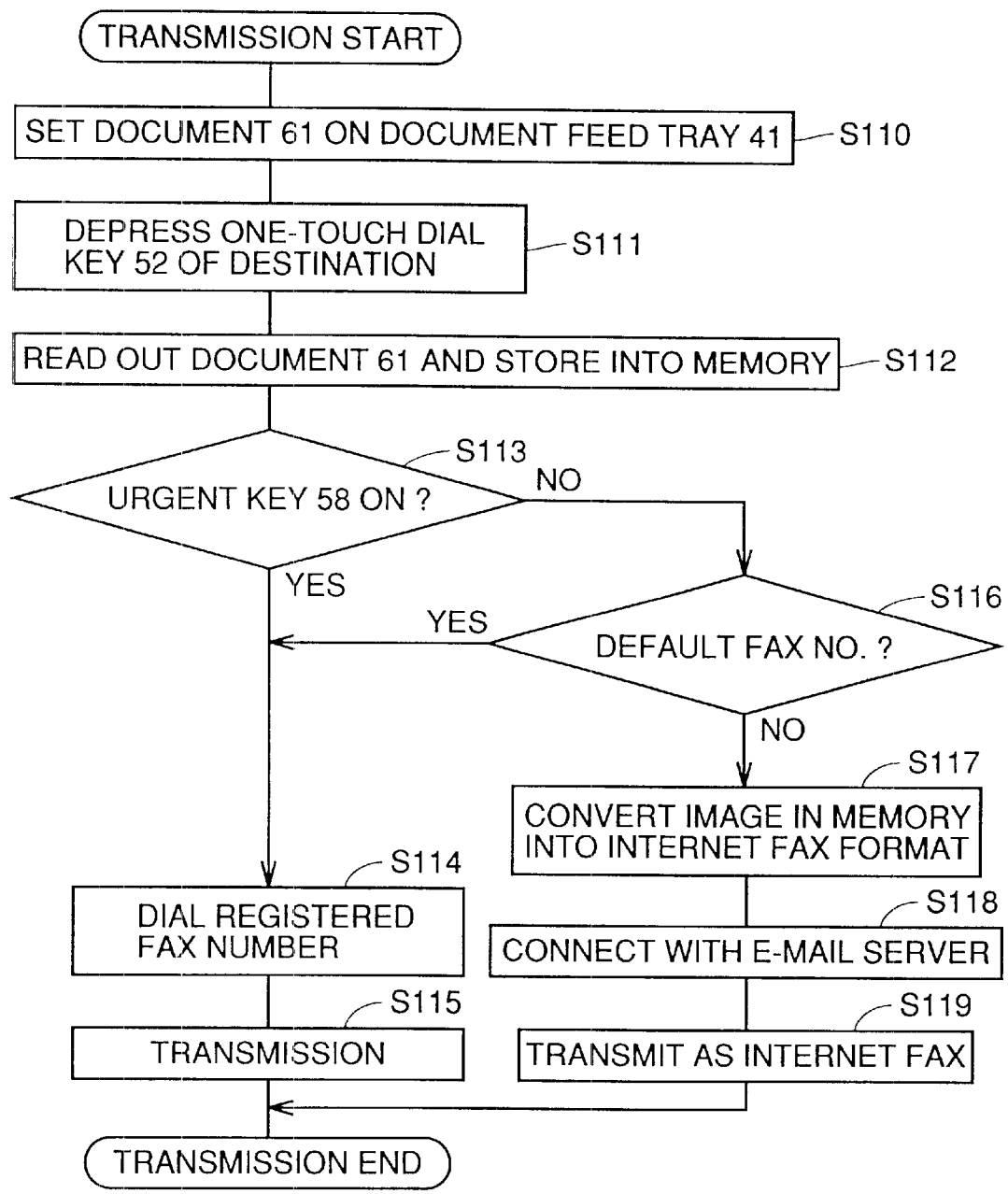
FIG. 22 is a flow chart showing the procedure of transmission of the facsimile apparatus of the fourth embodiment.

The transmission procedure of the facsimile apparatus of the fourth embodiment will be described hereinafter with reference to the flow chart of FIG. 22. First, the operator sets a document 61 on a document feed tray 41. One-touch dial key 52 to which the Fax number and the E-mail address of the recipient is registered is depressed (S111). Here, it is assumed that the Fax number and the E-mail address of the recipient are already registered at one-touch dial key 52 through destination register unit 38.

Image reader 32 reads out an image from document 61 and stores the image data in memory unit 34 (S112). Central control unit 31 determines whether urgent key 58 on operation panel 45 is depressed or not (S113). When urgent key 58 is depressed by the operator (S113: YES), the Fax number registered at one-touch dial key 52 is dialed (S114). Then, the image data stored in memory unit 34 is transmitted (S115).

When urgent key 58 is not depressed by the operator (S113: NO), determination is made whether transmission to the Fax number is set at the initialization process (S116). When transmission to the Fax number is set at initialization (S116: YES), control proceeds to step S114 to carry out the above-described process.

When transmission to the E-mail address is set at initialization (S116: NO), the image data stored in memory unit 34 is converted into a particular format (TIFF, PICT, and the like) (S117). Here, the address of the recipient and the address of the sender are attached as attachment document to the E-mail. Communication control unit 36 connects with the mail server via the Internet (S118). The image data is attached as attachment document to the E-mail including the addresses of the sender and the receiver. The complete E-mail is transmitted to the mail server (S119). Thus, transmission ends.

Figure 23:
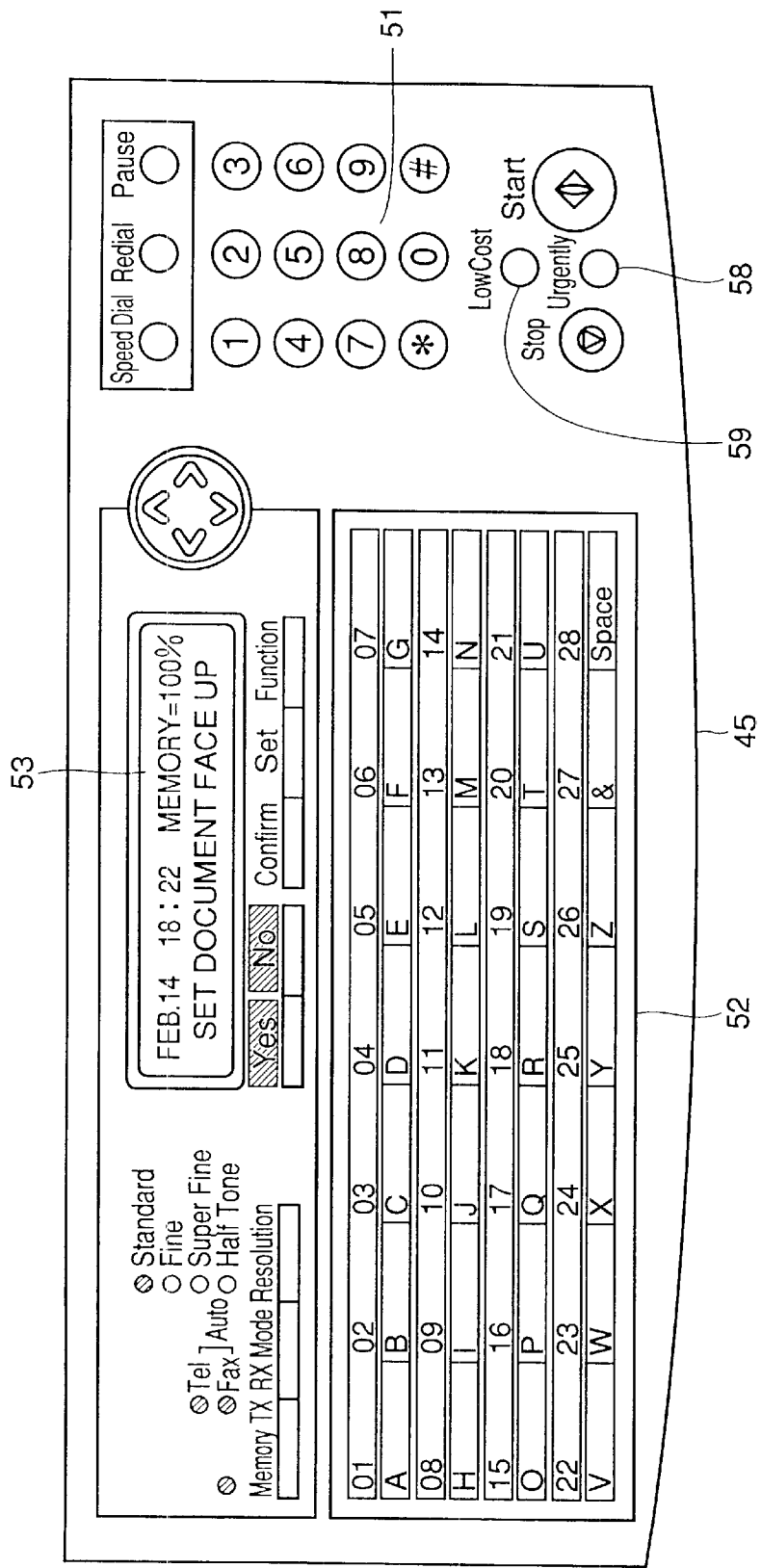
FIG. 23 shows another example of a top surface of an operation panel of the facsimile apparatus of the fourth embodiment.

When a low-cost key 59, if provided on operation panel 45 in addition to urgent key 58 as shown in FIG. 23, is depressed, the image data read out by reader 32 is transmitted to the mail server via the Internet with priority. In the case where reduction of the transmission cost is given priority, transmission through the Internet can be selected.

According to the facsimile apparatus of the fourth embodiment, a document can be transmitted reliably in a short time to the recipient through the telephone line by simple procedures when urgent transmission is desired. Also, transmission can be made through the Internet by a simple procedure in the case where the communication cost is to be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image transmitting apparatus for transmitting image data to an external image receiving apparatus through a network, said image transmitting apparatus comprising:

an image reading unit for reading an image of a document and for generating image data of the document;

a transmitting unit connectable with a first network and a second network to transmit the image data of the document to the external image receiving apparatus, the first network being different from the second network; and a controller for controlling said transmitting unit such that the image data of the document is transmitted to the external image receiving apparatus through one of said first and second networks, and such that the image data of the document is redundantly transmitted to the external image receiving apparatus through a remaining one of said first and second networks.

2. An image transmitting apparatus according to claim 1, wherein said controller can control said transmitting unit such that retransmission of the image data through the remaining one of said first and second networks is ceased when the image data transmitted through the one of said first and second networks is received by the external image receiving apparatus.

3. An image transmitting apparatus according to claim 1, wherein said first and second networks are a telephone network and an Internet, respectively.

4. An image transmitting apparatus according to claim 3, further comprising a converter for converting the image data into text data, wherein said controller can control said transmitting unit such that electric mail containing the text data as the image data is transmitted when the transmission is executed through the Internet.

5. An image receiving apparatus for receiving data regarding a document from an external image transmitting apparatus through a network, said image receiving apparatus comprising:

a receiving unit connectable with a first network and a second network to receive data regarding a document from the external image transmitting apparatus, the first network being different from the second network;

an image forming unit for forming an image of the document on a recording sheet based on the thus received data; and a controller for controlling said receiving unit and said image forming unit such that an image of the document based on image data transmitted through one of said first and second networks is formed, and such that an image of the document based on image data redundantly transmitted through a remaining one of said first and second networks is not formed.

6. An image receiving apparatus according to claim 5, wherein said first and second networks are a telephone network and an Internet, respectively.

7. An image transmitting apparatus for transmitting an image to an external image receiving apparatus through a network, said image transmitting apparatus comprising:

an image reading unit for reading an image of a document and for generating image data of the document;

a memory unit for storing data regarding a binary file;

a transmitting unit connectable with a network to transmit electronic mail to the external image receiving apparatus;

a converter for converting said image data read by said image reading unit into first text data and for converting said data regarding the binary file into second text data; and a controller for controlling said transmitting unit such that electronic mail including the first and second text data is transmitted.

8. An image transmitting apparatus according to claim 7, wherein said second text data are included in the electronic mail as an attachment file.

9. An image transmitting apparatus according to claim 7, wherein said network is an Internet.

10. An image transmitting apparatus according to claim 7, wherein said memory unit includes a detachable memory.

11. An image receiving apparatus for receiving an image from an external image transmitting apparatus through a network, said image receiving apparatus comprising:

a memory unit for storing data regarding a binary file;

a receiving unit connectable with a network to receive electronic mail from the external image transmitting apparatus, said electronic mail including first text data and second text data, said first text data representing image data of a document, and said second text data representing data regarding a binary file;

a converter for converting the first text data into the image data and the second text data into the data regarding the binary file;

an image forming unit for forming an image of the document from the image data; and a controller for controlling said image forming unit such that an image, based on the image data converted by said converter, is formed and for controlling said memory unit such that the data regarding the binary file is stored.

12. An image receiving apparatus according to claim 11, wherein said second text data are included in the electronic mail as an attachment file.

13. An image receiving apparatus according to claim 11, wherein said network is an Internet.

14. An image receiving apparatus according to claim 11, wherein said memory unit includes a detachable memory.

15. An image transmitting apparatus for transmitting an image to an external image receiving apparatus through a network, said image transmitting apparatus comprising:

a transmitting unit which is connectable with a telephone network and an Internet;

a memory unit for storing a facsimile number and an electronic mail address of the external image receiving apparatus;

a converter for converting image data into text data; and a controller for controlling said transmitting unit such that the image data are transmitted to said external image receiving apparatus through the telephone network in accordance with the facsimile number stored in the memory unit when the transmission of the image data through the telephone network is established, and such that electronic mail including the text data is transmitted to said external image receiving apparatus through the Internet based on the electronic mail address stored in the memory unit when the controller determines that the transmission of the image data through the telephone network cannot be established.

16. An image transmitting apparatus according to claim 15, further comprising an image reading unit for reading an image of a document and for generating image data;

wherein said converter can convert the image data generated by said image reading unit into the text data, and wherein said controller can control said transmitting unit such that the image data generated by said image reading unit and the text data are transmitted.

17. An image transmitting apparatus according to claim 15, wherein said controller can control said transmitting unit such that the image data are retransmitted to the external image receiving apparatus through the telephone network in accordance with the facsimile number stored in the memory unit when the electronic mail cannot be successfully transmitted during a predetermined time interval.

18. An image transmitting apparatus for transmitting an image to an external image receiving apparatus through a network, said image transmitting apparatus comprising:
   an image reading unit for reading an image of a document and for generating image data;
   a memory for storing a first identification code and a second identification code, said first and second identification codes being for identifying said external image receiving apparatus;
   a transmitting unit which is connectable with a network;
   a mode selector for selectively selecting one of a first transmitting mode and a second transmitting mode, said first identification code corresponding to said first transmitting mode, and said second identification code corresponding to said second transmitting mode; and
   a controller for controlling said transmitting unit such that the image data generated by said image reading unit are transmitted to the external image receiving apparatus through said network under the thus selected transmitting mode in accordance with the respective identification code.

19. An image transmitting apparatus according to claim 18, wherein said network comprises a first network and a second network, and wherein the image data can be transmitted through said first network in said first transmitting mode and through said second network in said second transmitting mode.

20. An image transmitting apparatus according to claim 19, wherein said first and second networks are a telephone network and an Internet, respectively.

21. An image transmitting apparatus according to claim 20, wherein said first identification code is a facsimile number of the external image receiving apparatus and said second identification code is an electronic mail address of the external image receiving apparatus.

22. An image transmitting apparatus according to claim 20, wherein said transmitting apparatus is capable of transmitting the image data on said first network under said first transmitting mode faster than the transmission of the image data on said second network under said second transmitting mode.

23. An image transmitting apparatus according to claim 20, wherein the transmission of the image data on said second network under said second transmitting mode is less expensive than the transmission of the image data on said first network under said first transmitting mode.

24. An image transmitting apparatus according to claim 20, further comprising:
   a converter for converting the image data into text data; and
   wherein said controller can control said transmitting unit such that electronic mail including the text data is transmitted to the external image receiving apparatus as the image data when said second transmitting mode is selected by said mode selector.

25. A method for transmitting image data to an external image receiving apparatus through a network, said method comprising the steps of:
   reading an image of a document and generating image data of the document; and
   transmitting the image data of the document to the external image receiving apparatus through one of a first network and a second network and redundantly transmitting the image data of the document to the external image receiving apparatus through the remaining one of said first and second networks.

26. A method for receiving data regarding a document from an external image transmitting apparatus through a network, said method comprising the steps of:
   receiving data regarding a document from an external image transmitting apparatus through at least one of a first network and a second network; and
   when image data are redundantly transmitted over the first network and the second network, forming an image of the document based on the image data transmitted through the one of said first and second networks, and not forming an image of the document based on the image data transmitted through a remaining one of said first and second networks.

27. A method for transmitting an image to an external image receiving apparatus through a network, said method comprising the steps of:
   reading an image of a document and generating image data of the document;
   converting said generated image data into first text data and converting data regarding a binary file into second text data; and
   transmitting electronic mail which includes the first text data and the second text data through a network.

28. A method for receiving an image from an external image transmitting apparatus through a network, said method comprising the steps of:
   receiving electronic mail from the external image transmitting apparatus, said electronic mail including first text data and second text data, the first text data representing image data of a document and the second text data representing data regarding a binary file;
   converting the first text data into the image data and the second text data into the data regarding the binary file; and
   forming an image based on the converted image data and storing the converted data regarding the binary file.

29. A method for transmitting an image to an external image receiving apparatus through a network, said method comprising the steps of:
   converting image data into text data;
   establishing a connection through a telephone line of a telephone network;
   upon establishing such a connection, transmitting the image data to the external image receiving apparatus through said telephone network in accordance with a facsimile number; and
   upon failing to establish such a connection, transmitting electronic mail containing the converted text data to the external image receiving apparatus through an Internet based on an electronic mail address.

30. A method for transmitting an image to an external image receiving apparatus through a network, said method comprising the steps of:
   reading an image of a document and generating image data;
   selecting one of a first transmitting mode and a second transmitting mode, a first stored identification code corresponding to said first transmitting mode and a second stored identification code corresponding to said second transmitting mode; and
   transmitting the generated image data to the external image receiving apparatus through a network under the selected transmitting mode in accordance with the respective identification code.

31. An image transferring apparatus comprising:

an image reading unit for reading an image of a document and for generating image data of the document;

a transmitting unit connectable with a first network and a second network to transmit said image data of the document, the first network being different from the second network;

a receiving unit connectable with said first network and said second network to receive said image data of the document from said transmitting unit;

a transmitting unit controller for controlling said transmitting unit such that the image data of the document are transmitted to said receiving unit through one of said first and second networks and transmitted to said receiving unit through a remaining one of said first and second networks;

an image forming unit for forming an image of the document on a recording sheet based on received data received by said receiving unit; and a receiving unit controller for controlling said receiving unit and said image forming unit such that an image of the document, based on data transmitted through one network, is formed, and such that an image of the document, based on data transmitted through the other network, is not formed.

32. A method of transferring image data from a transmitting apparatus to a receiving apparatus through a network, said method comprising the steps of:

transmitting said image data from said transmitting apparatus to said receiving apparatus through a first one of a first network and a second network;

transmitting said image data from said transmitting apparatus to said receiving apparatus through a second one of said first network and said second network;

receiving said image data through at least one of said first network and said second network; and forming an image of the document based on image data transmitted through one network and received first by said receiving apparatus, and refraining from forming an image of the document based on image data transmitted through the other network and that is received later by said receiving apparatus.

33. An image transferring apparatus comprising:

an image reading unit for reading an image of a document and for generating image data of the document;

a memory unit for storing data regarding a binary file;

a transmitting apparatus connectable with a network to transmit electronic mail to said receiving apparatus;

a converter for converting said image data into first text data and for converting said data regarding a binary file into second text data;

a controller for controlling said transmitting apparatus such that electronic mail including the first and second text data is transmitted;

a receiving apparatus connectable to said network for receiving the thus transmitted electronic mail, the thus received electronic mail including said first text data and said second text data, said first text data representing image data of said document, and said second text data representing said data regarding a binary file;

a converter for converting the thus received first text data into received image data and the thus received second text data into received data regarding the binary file;

an image forming unit for forming an image of the document from the thus received image data; and a controller for controlling said image forming unit such that an image, based on the thus received image data, is formed, and for controlling said memory unit such that the thus received data regarding the binary file are stored.

34. A method for transferring an image from an image transmitting apparatus to an image receiving apparatus through a network, said method comprising the steps of:

reading an image of a document;

generating image data of said document;

converting said image data into first text data;

converting data regarding a binary file into second text data;

transmitting electronic mail which includes the first text data and the second text data through said network;

receiving electronic mail from said image transmitting apparatus, said electronic mail including said first text data and said second text data, said first text data representing image data of said document and said second text data representing said data regarding a binary file;

converting said first text data into converted image data and said second text data into converted data regarding the binary file;

forming an image based on the converted image data; and storing the converted data regarding the binary file.

* * * * *